United States Patent
Harvey

(10) Patent No.: US 12,241,971 B2
(45) Date of Patent: Mar. 4, 2025

(54) AIR TRAFFIC CONTROL ANTENNA AND SYSTEM

(71) Applicant: James Harvey, Almonte (CA)

(72) Inventor: James Harvey, Almonte (CA)

( * ) Notice: Subject to any disclaimer, the term of this patent is extended or adjusted under 35 U.S.C. 154(b) by 851 days.

(21) Appl. No.: 17/296,750

(22) PCT Filed: Nov. 22, 2019

(86) PCT No.: PCT/CA2019/051678
§ 371 (c)(1),
(2) Date: May 25, 2021

(87) PCT Pub. No.: WO2020/102911
PCT Pub. Date: May 28, 2020

(65) Prior Publication Data
US 2022/0026565 A1    Jan. 27, 2022

Related U.S. Application Data

(60) Provisional application No. 62/770,957, filed on Nov. 23, 2018.

(51) Int. Cl.
*G01S 13/91* (2006.01)
*G01S 13/78* (2006.01)
(Continued)

(52) U.S. Cl.
CPC ............ *G01S 13/91* (2013.01); *G01S 13/781* (2013.01); *H01Q 21/08* (2013.01); *H01Q 25/02* (2013.01)

(58) Field of Classification Search
CPC ...... G01S 13/91; G01S 13/781; G01S 13/762; G01S 13/913; G01S 3/46; G01S 3/36;
(Continued)

(56) References Cited

U.S. PATENT DOCUMENTS 5,598,163 A * 1/1997 Cornic ................. G01S 13/426
                                                   342/107
6,819,285 B1 * 11/2004 Stockman ............. G01S 7/4021
                                                   342/146
(Continued)

FOREIGN PATENT DOCUMENTS

EP          0028969        5/1981
EP          0028969 A1 * 5/1981 ............... H01Q 3/40
(Continued)

OTHER PUBLICATIONS

Weber, M.E. et al. "Secondary Surveillance Phased Array Radar (SSPAR): Initial Feasibility Study" Feb. 6, 2014. Massachusetts Institute of Technology. 54 Pages.
(Continued)

*Primary Examiner* — Seokjin Kim
(74) *Attorney, Agent, or Firm* — McDonald Hopkins LLC

(57) ABSTRACT

Systems and methods relating to air traffic control and navigational aids for aircraft. An antenna system uses a multi-sector sensor that uses two vertical column antenna arrays per sector. Each pair of vertical column antenna arrays produces two beams that are off a boresight for each pair of antenna arrays. Wide angle monopulse processing is used to determine an azimuth or angle of arrival for an aircraft using at least one pair of the vertical column antenna arrays. Predetermined correction factors are applied to the azimuth for specific elevation values and, for elevation values without predetermined correction factors, interpolation between known predetermined correction values to arrive at the corrector factor to be applied.

16 Claims, 23 Drawing Sheets

(51) Int. Cl.
*H01Q 21/08* (2006.01)
*H01Q 25/02* (2006.01)

(58) Field of Classification Search
CPC .......... G01S 3/7803; G01S 7/03; G01S 7/403; H01Q 21/08; H01Q 25/02; H01Q 3/242
See application file for complete search history.

(56) References Cited

U.S. PATENT DOCUMENTS

| | | | | |
|---|---|---|---|---|
| 11,320,528 B1* | 5/2022 | Messina | ................ | G01S 13/872 |
| 2004/0046687 A1* | 3/2004 | LaFrey | ................ | G08G 5/0026 |
| | | | | 342/39 |
| 2004/0196172 A1* | 10/2004 | Wasiewicz | ............ | G01S 13/913 |
| | | | | 342/33 |
| 2006/0092075 A1* | 5/2006 | Bruce | ....................... | G01S 7/02 |
| | | | | 342/149 |
| 2010/0085237 A1* | 4/2010 | Cornic | ................. | G01S 13/913 |
| | | | | 342/33 |
| 2011/0309966 A1* | 12/2011 | Descharles | ......... | G01S 13/4463 |
| | | | | 342/149 |
| 2012/0092211 A1 | 4/2012 | Hampel et al. | | |
| 2012/0112953 A1* | 5/2012 | Grau Besoli | ........... | G01S 13/87 |
| | | | | 342/146 |
| 2015/0061921 A1* | 3/2015 | Ding | .................... | H01Q 21/065 |
| | | | | 342/149 |
| 2017/0234970 A1* | 8/2017 | Harvey | ................. | G01S 7/4026 |
| | | | | 342/195 |
| 2019/0064341 A1* | 2/2019 | Bunch | ...................... | G01S 13/86 |
| 2020/0072764 A1* | 3/2020 | Vacanti | .................... | G01S 7/026 |

FOREIGN PATENT DOCUMENTS

| | | | | | |
|---|---|---|---|---|---|
| EP | 0088528 | | 9/1983 | | |
| EP | 0088528 | A1 * | 9/1983 | ........... | G01S 13/762 |
| EP | 0224447 | A1 * | 6/1987 | ............. | G01S 13/44 |
| EP | 2960671 | A1 * | 12/2015 | ........... | G01S 13/762 |
| FR | 3023009 | X | 1/2016 | | |
| GB | 2281671 | | 3/1995 | | |
| GB | 2281671 | A * | 3/1995 | ......... | G01S 13/4463 |
| WO | WO-2008113750 | A1 * | 9/2008 | ........... | G01S 13/685 |

OTHER PUBLICATIONS

International Search Report and Written Opinion Mailed Mar. 5, 2020; International Patent Application No. PCT/CA2019051678 filed on Nov. 22, 2019. ISA/CA.

Extended European Search Report issued on European Patent Application No. 19887446.3 on Oct. 17, 2022. 19 pages.

Sato et al., "Cylindrical Active Phased Array Antenna", IEICE Transactions on Communications E76-B, No. 10, 2334b, Oct. 1993.

* cited by examiner

AIR TRAFFIC CONTROL ANTENNA AND SYSTEM

CROSS-REFERENCE TO RELATED APPLICATION

This application is a 35 U.S.C. 371 national stage filing of PCT Application No. PCT/CA2019/051678 filed on Nov. 22, 2018, entitled "AIR TRAFFIC CONTROL ANTENNA AND SYSTEM," which claims priority to U.S. Provisional Patent Application No. 62/770,957 filed on Nov. 23, 2018, each of which is incorporated by reference herein in their entireties.

TECHNICAL FIELD

The present invention relates to air traffic control and navigation. More specifically, the present invention relates to systems and methods relating to antenna systems for use in air traffic control.

BACKGROUND

Air traffic control systems logically arose from the increase in aircraft traffic, both for military and civilian aircraft. Multiple systems were developed that could be used to facilitate air traffic control. These systems, however, tended to be quite complex and expensive. Such systems are, currently, not suitable for remote airstrips (such as in the Canadian north) and rough air bases (such as those established to support military operations in remote areas).

One system that was developed was Secondary Surveillance Radar (SSR). This is a "co-operative" surveillance system that requires aircraft to be equipped with a transponder that transmits data to ground radar when interrogated by that ground radar. The ground radar interrogates at 1030 MHz and the aircraft responds at 1090 MHz with its transponder code and with the aircraft's altitude.

Another system that was developed was the Automatic Dependent Surveillance-Broadcast (ADS-B) system. This is an upgrade to the transponder on the aircraft and it automatically transmits the aircraft's data and GPS-derived position at least once per second. This transmission is performed without the need for ground interrogation. This technology only requires a simple radio receiver and processor on the ground.

These two technologies are generally used with radar antennas. From 1960 to 2000, the most popular radar was the Hog Trough Antenna with Sliding Window Processing (see FIG. 1). Here, as the antenna swept by an aircraft, the aircraft would respond to the interrogations. The azimuth where the response was first detected would be recorded and the azimuth where the responses stopped would also be recorded. The average of the two azimuths would then be used as the azimuth to the aircraft. The disadvantages of this technique included:
  a) Splits, where responses in the middle of the response pattern would be lost due to interference from other sources; aircraft manoeuvring; etc. This sometimes resulted in the radar declaring two or more targets.
  b) A high Pulse Repetition Frequency (PRF) of interrogating resulting in RF "pollution".

The azimuth resolution of the Hog Trough antenna (see FIG. 2) was around 2.5 degrees. The Sliding Window Processing improved this (sometimes) to ±0.2 degrees. However, the high elevation beamwidth of the Hog Trough Antenna caused a large number of ground reflections that, in turn, caused deep nulls in the beam (with ground reflections adding to and cancelling the direct beam). Because of this, aircraft would fly in-and-out of coverage when flying towards and away from the radar (see FIG. 3).

Initially, aircraft separation was set at 5 nautical miles when using this Hog Trough Antenna radar. However, this separation became a problem when traffic density increased dramatically, starting in the 1970s. This was particularly acute in high-air-traffic-density areas such as the well-known airports like LAX, O'Hare, New York, Heathrow etc. Because of this, a more expensive solution, Large Vertical Array (LVA) antenna with monopulse processing (see FIG. 4) was developed to reduce separation to 3 nautical miles. However, while separation was achieved at 3 nautical miles, this was an expensive solution. The system used to achieve this was three times the cost of the Hog Trough Antenna with Sliding Window Processing.

For low density air spaces, such solutions are prohibitive. There is therefore a need for systems and methods that are suitable for low density air spaces but are not overly expensive and, which, preferably, also offer the advantages of much more expensive and complex systems.

SUMMARY

The present invention provides systems and methods relating to air traffic control and navigational aids for aircraft. An antenna system uses a multi-sector sensor that uses two vertical column antenna arrays per sector. Each pair of vertical column antenna arrays produces two beams that are off a boresight for each pair of antenna arrays. Wide angle monopulse processing is used to determine an azimuth or angle of arrival for an aircraft using at least one pair of the vertical column antenna arrays. Predetermined correction factors are applied to the azimuth for specific elevation values and, for elevation values without predetermined correction factors, interpolation between known predetermined correction values to arrive at the corrector factor to be applied.

In a first aspect, the present invention provides an antenna system for use in air traffic control, the system comprising:
  at least one pair of vertical column antenna arrays, said at least one pair producing two beams offset from boresight and said at least one pair covering a sector of a coverage of said antenna system;
  wherein said antenna system is used for wide angle monopulse processing of at least one signal from an aircraft to determine a two-dimensional azimuth of said aircraft relative to said at least one pair of said vertical column antenna arrays.

In a second aspect, the present invention provides an antenna system for air traffic control applications, the antenna system comprising:
  a static, circular, multi-sector antenna sensor for use in wide angle monopulse processing of at least one signal originating from an aircraft to determine an angle of arrival or azimuth of said at least one signal relative to said antenna sensor;
  wherein said antenna sensor comprises at least one pair of vertical column antenna arrays, said at least one pair producing two beams offset from a boresight for said at least one pair and said at least one pair covering a sector of said multi-sector coverage of said antenna system.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 5:
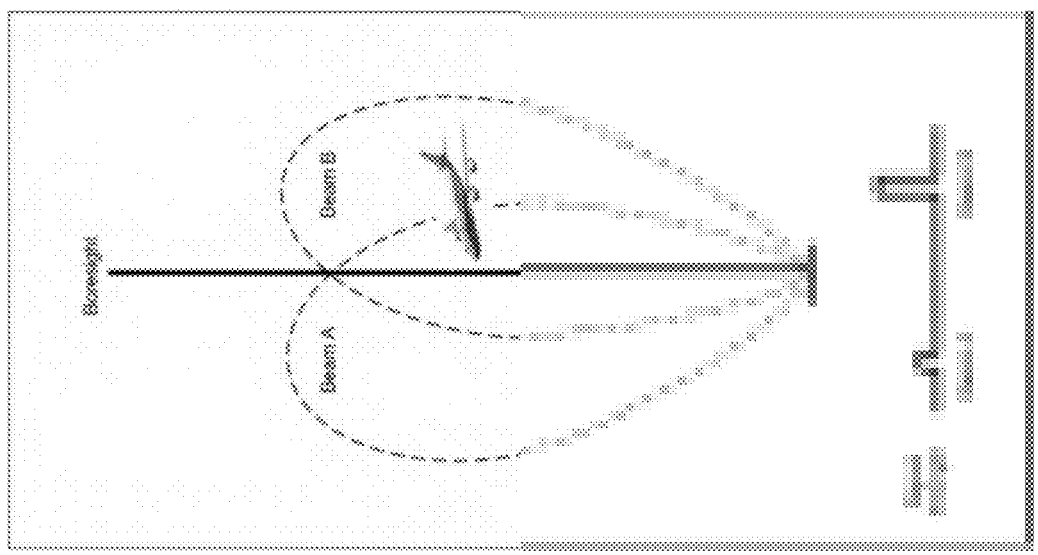
FIG. 5 schematically illustrates monopulse processing.
Figure 6:
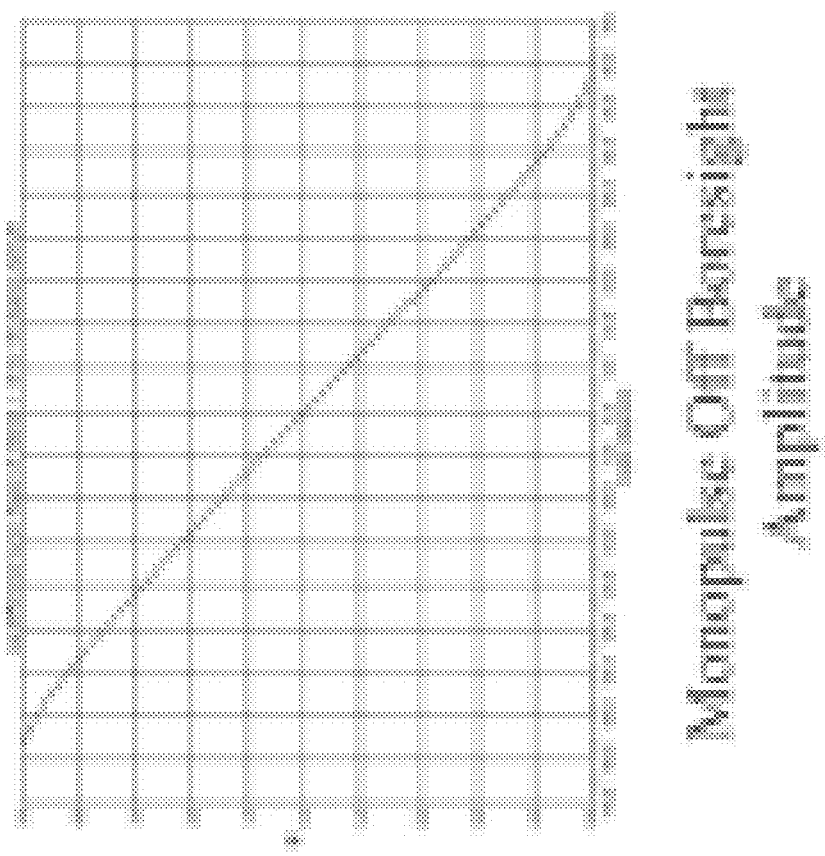
FIG. 6 shows monopulse off-boresight ratio for calculating azimuth or angle of arrival.

One aspect of the present invention uses monopulse processing. Monopulse processing uses two (or more) antenna beams that are "squinted" off of a common boresight (see FIG. 5). If an aircraft is on the boresight, the amplitude in each antenna beam will be the same and the phase between the two beams will be zero. Conversely, if the aircraft is off the boresight, the amplitude in each beam will be different and there will be a phase difference. The logarithm of the difference in amplitude/phase is a range-independent ratio (see FIG. 6) that provides the angle off the boresight. Alternatively, the angle off boresight may be predetermined based on the values of the amplitude/phase of the beams. Thus, instead of having to calculate the angles based on the values of the amplitude/phase, a lookup table may be used to arrive at the desired angle values.

Figure 1:
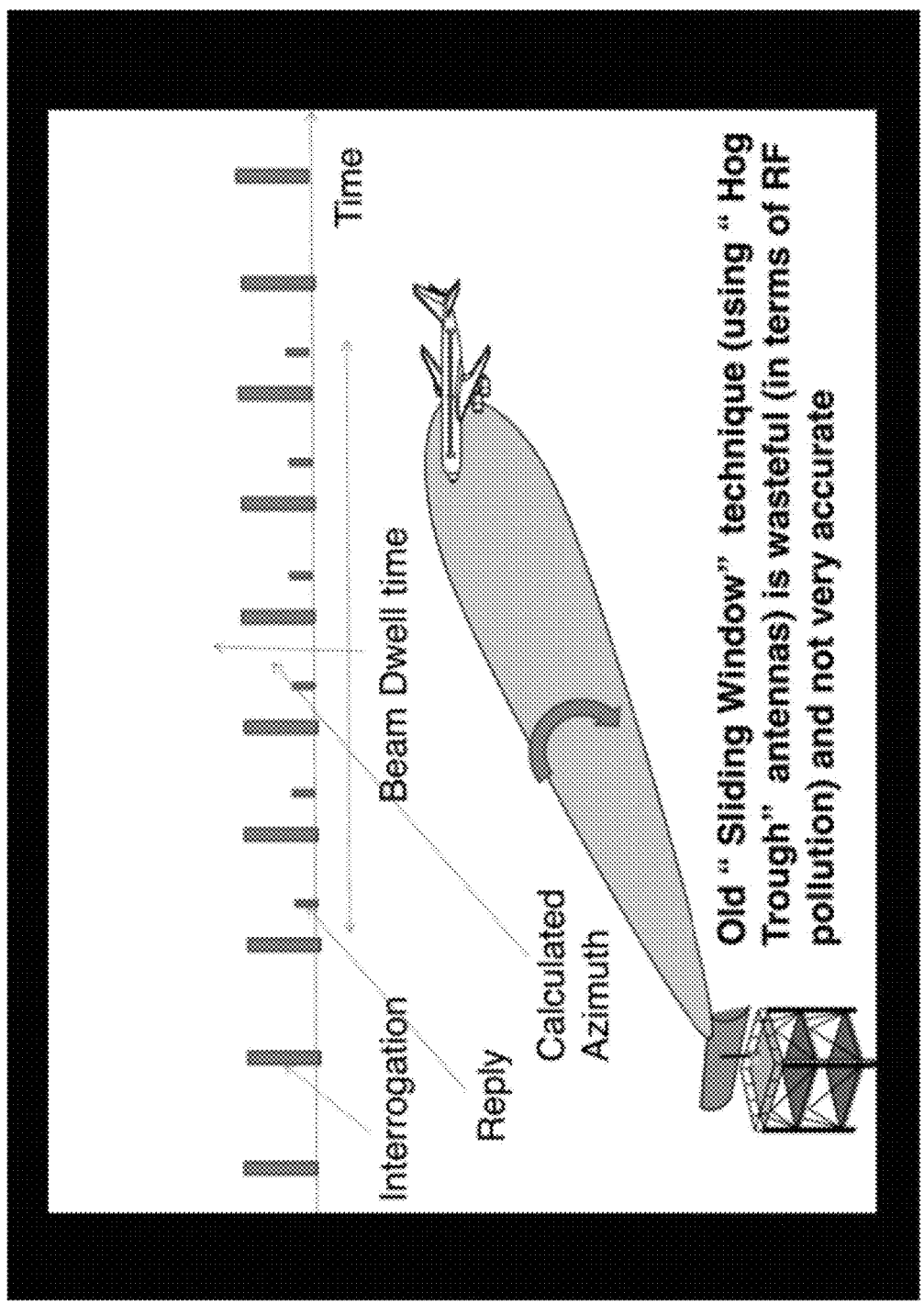
FIG. 1 illustrates a Hog Trough Antenna with Sliding Window processing.
Figure 2:
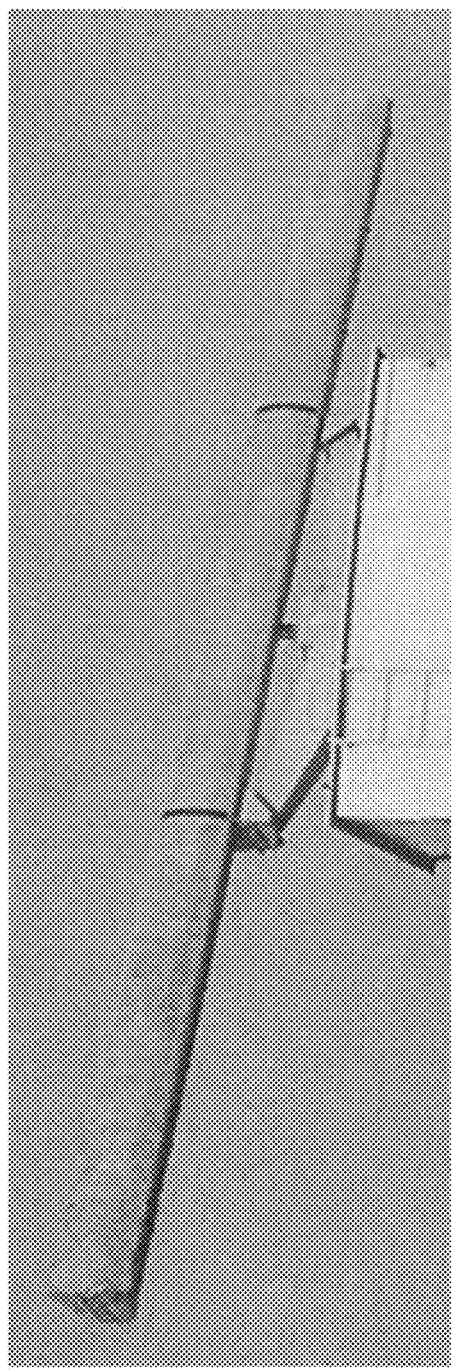
FIG. 2 illustrates a Hog Trough antenna.
Figure 3:
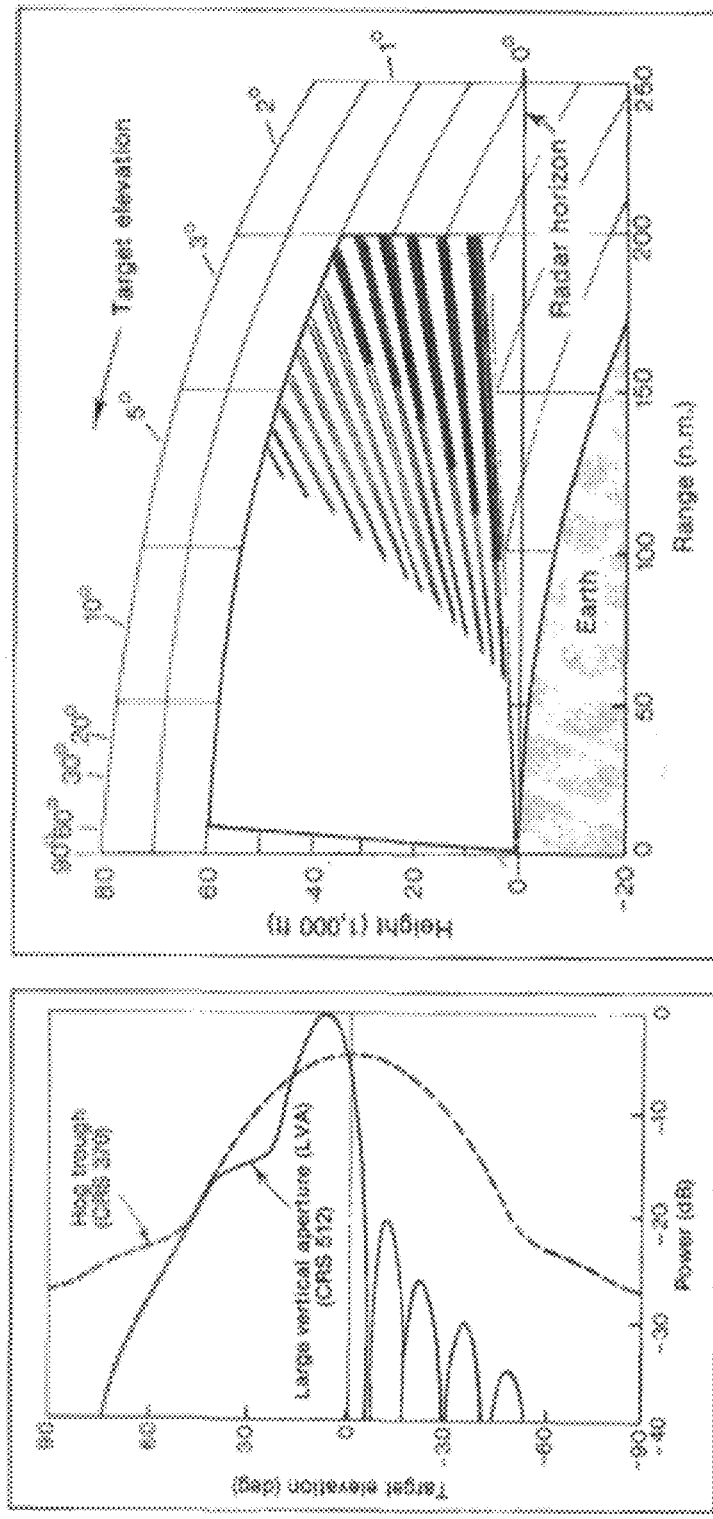
FIG. 3 illustrates shortcomings of the hog trough antenna.
Figure 4:
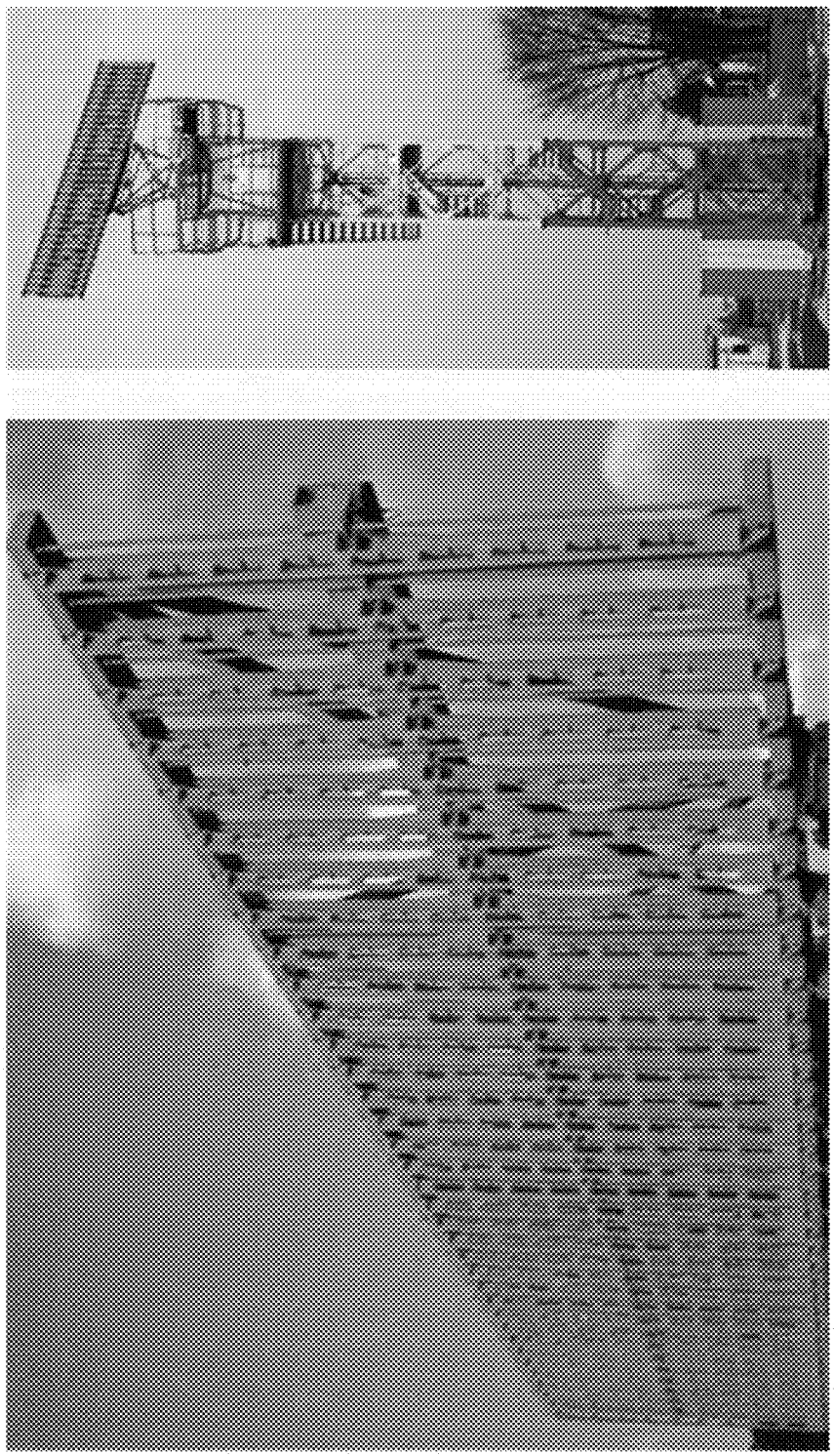
FIG. 4 illustrates an LVA antenna.

In theory, MSSR (monopulse secondary surveillance radar) needs only 1 response from an aircraft to accurately detect the azimuth of the aircraft (mono-pulse). Also, the azimuth resolution can range from 0.0600 to 0.100 for production systems. In addition, the tailored elevation beamwidth ($COSEC^2$) beams a lot less power into the ground (see FIG. 3). This results in lower loss of aircraft detection due to "lobbing" (nulls in the beam).

Figure 7:
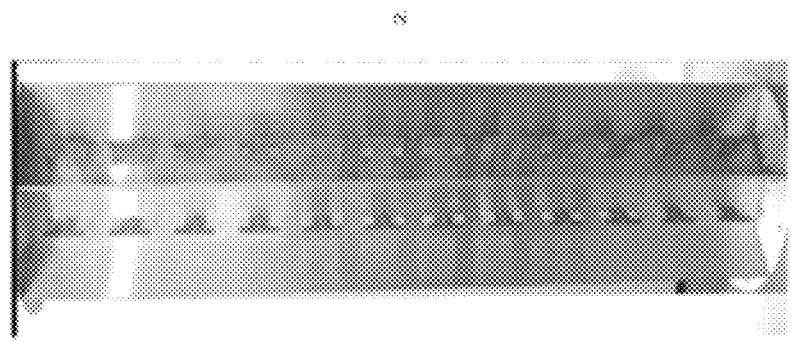
FIG. 7 illustrates one implementation of an antenna system according to the present invention.

In one aspect of the present invention, the present invention provides a static, circular, sectored antenna (see FIG. 7) that uses Wide Angle Monopulse Processing (WAMP) for Angle Of Arrival (AOA) Processing to achieve better azimuth resolution than the Hog Trough with Sliding Window Processing. This aspect of the present invention also achieves a similar azimuth resolution to lower cost MSSRs at ⅕ the cost of MSSRs. This aspect of the present invention applies Error Correction Curves (see FIG. 8) to the logarithmic ratio noted above. This can improve the azimuth resolution by a factor of ×10. It should be clear that FIG. 7 shows a six sector embodiment of the present invention and that other embodiments with a different number of sectors are possible.

The $COSEC^2$ Elevation beamwidth pattern is designed to present a constant level of power to the radar receiver as the aircraft flies towards/away from the radar at the same altitude (say 33,000 ft.). As the aircraft flies towards the radar, the aircraft presents a "stronger" signal. This is offset by a lower gain of the antenna. However, the side-effect of this is to "widen" or increase the horizontal beamwidth and to reduce gain as the elevation angle of the aircraft increases. This reduces the AOA (angle of arrival) resolution with elevation.

This reduction in resolution with elevation can be compensated for by a correction factor based on elevation angle and slant range. This correction factor can be significantly improved by applying a novel technique based on:

a) Applying an Error Minimization/Correction Curve every "x" degrees of elevation.

b) Interpolating an Error Minimization/Correction factor between each "x" degrees of elevation.

To clarify, the antenna system is preconfigured and calibrated during manufacture such that the correction curve is known or predetermined for changes in elevation. Thus, during manufacture, the idiosyncracies of the antenna are known and considered and the appropriate correction is predetermined for specific discrete elevation angles and is automatically applied accordingly. For elevation angles that do not exactly correspond to the known/predetermined angles for which there are appropriate correction factors, interpolation is automatically performed between the elevation angles for which correction factors are known. The interpolated correction factors are then similarly automatically applied.

For even greater clarity, it should be clear that traditional monopulse antennas have a 3 dB beamwidth of 2-3 degrees. These can achieve an azimuth resolution of 0.05 to 0.1 degrees. Wide Angle Monopulse processing can also achieve an azimuth improvement of 60. Thus, for a 60 degrees beamwidth, the resolution is 1 degree. However, when the above noted error correction technique is applied, the azimuth improvement can result in another order of magnitude improvement, namely 600. The resulting azimuth resolution of 0.1 degrees (see FIG. 8) compares favorably with traditional monopulse antenna and processing for SSR.

Figure 9:
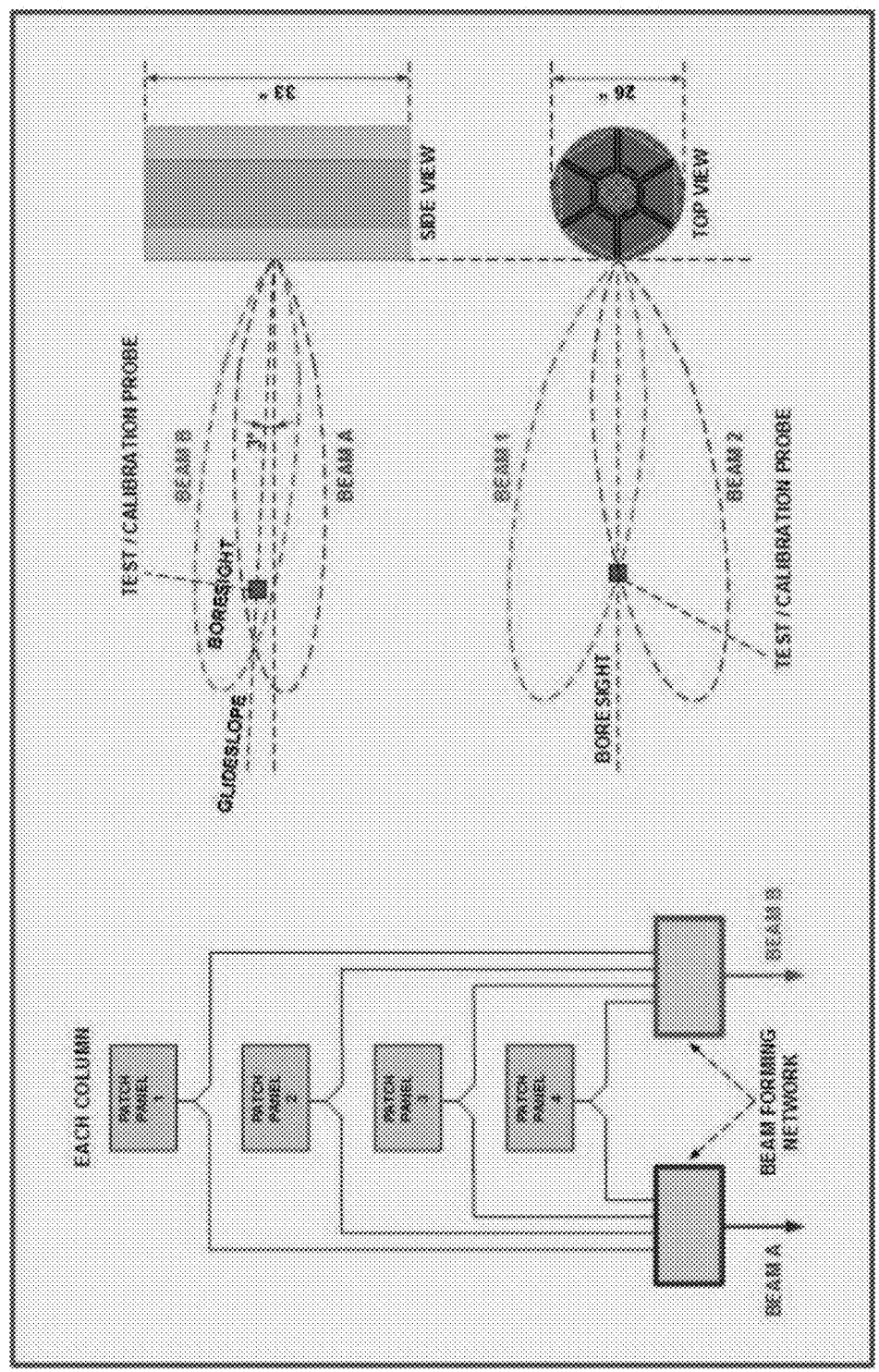
FIG. 9 illustrates beam forming to achieve off boresight beams to determine both azimuth and elevation of aircraft.
Figure 10:
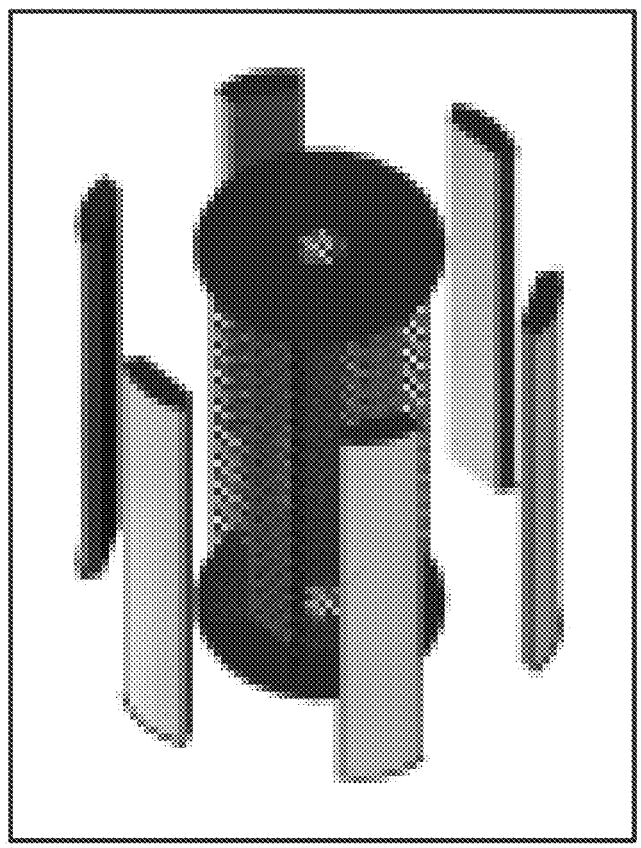
FIG. 10 is an exploded view of one implementation of the present invention.

Various embodiments of the present invention may include a test/calibration probe that is integrated into the antenna. This is placed on the boresight of each pair of columns of the sectorized antenna, thereby allowing routine and on-demand test/calibration. In addition to calibration, this allows for a test target to be injected into the antenna to thereby eliminate the need for a separate test transponder. Such a test transponder is explained below. This is shown in FIG. 9. The left side of FIG. 9 shows that each pair of columns of the antenna produces two beams and that these beams are produced using beam forming networks. A top view of a six sector implementation is shown in the bottom right side of FIG. 9 to illustrate that a six sector implementation would use six different vertical columns of antenna array elements and that each sector would be covered by a pair of these vertical columns of antenna array elements. Each pair of columns would produce two beams and the boresight of each pair of columns would be at the point of contact between the two columns (see the top view at the bottom right corner of FIG. 9). The side view of the six sector implementation, shown at the top right corner of FIG. 9) shows the test/calibration probe and the beams produced by the two vertical columns. It should be clear that, in one implementation, each array uses four vertically arranged patch panels (see left side of FIG. 9). Other implementations may use 4, 6, 8, or 12 vertically arranged patch panels per vertical column. The implementation illustrated uses patch panel antenna elements but dipole antenna elements may also be used in lieu of the patch panel antenna elements. Alternatively, dielectric resonators antenna elements, cavity based slot antenna elements, and open ended waveguide antenna elements may be used along with other antenna elements known to those of skill in the art. In FIG. 10, an exploded view of a six sector implementation shows that each vertical antenna column may be implemented as bolt-in columns for ease of packing, assembly, transport, and disassembly. To address weight concerns, lightweight materials may be used in the construction of the supporting structure of the antenna. As an example, it can be seen that the structural columns between the vertical antenna columns are not solid but use lightening holes to save on weight.

For greater clarity, it should be understood that the implementation in FIG. 10 splits the antenna elements (dipole or patch) in each column into two or more beams using beam-forming networks. The two beams can then be beam-formed to provide two vertical beams skewed off a common boresight. This allows for monopulse processing for the elevation determination of an aircraft.

Figure 11:
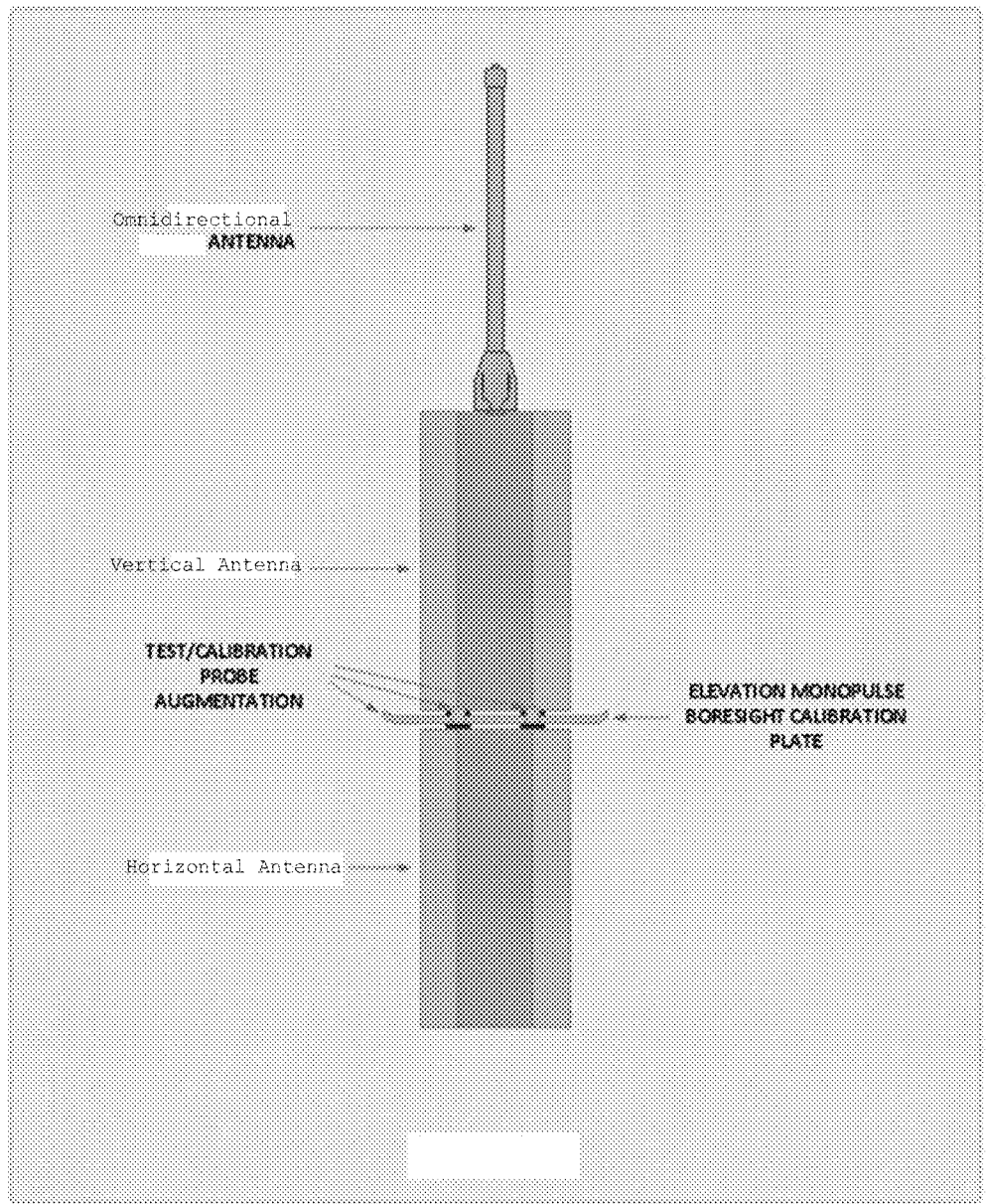
FIG. 11 is a side view of a stacked configuration of one implementation of the present invention.
Figure 12:
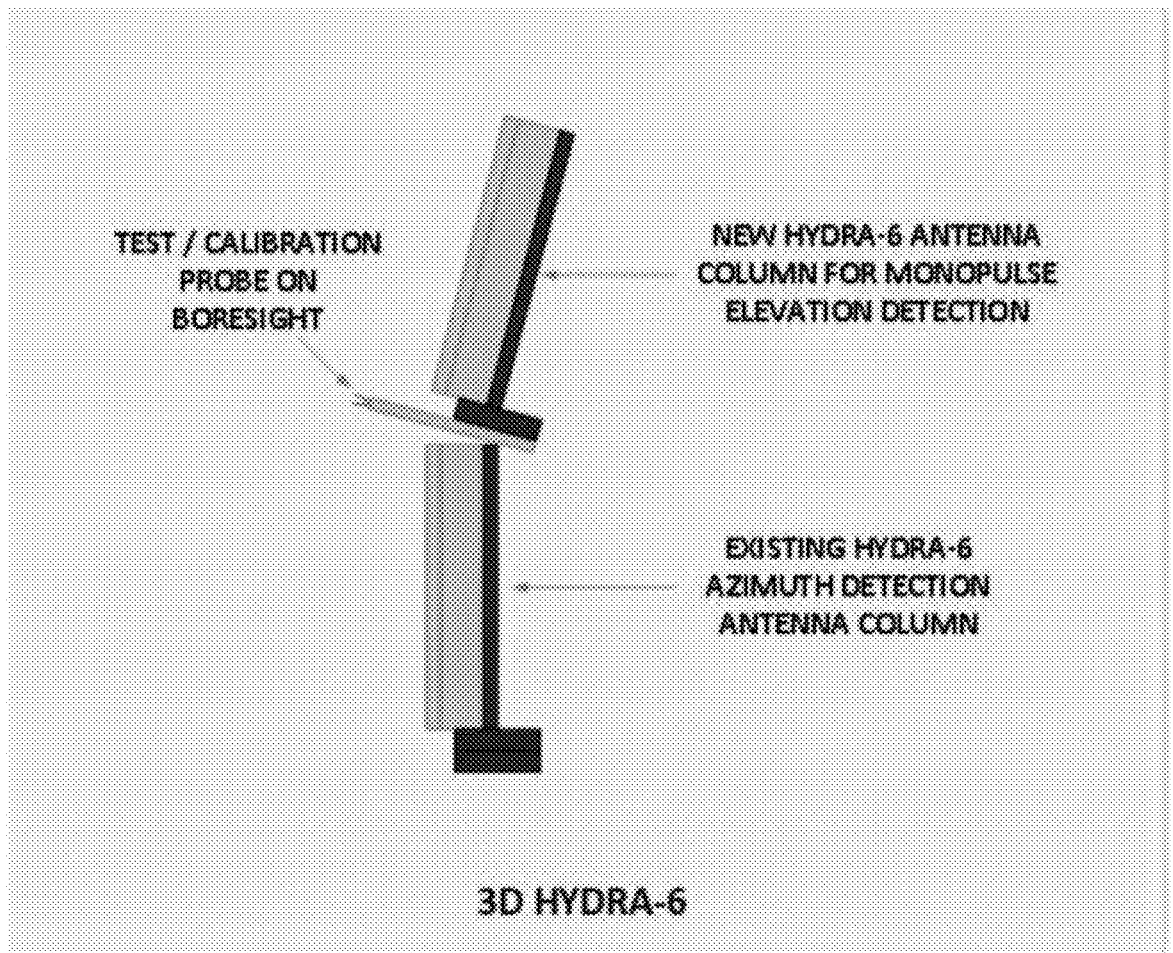
FIG. 12 illustrates a side view of the stacked configuration in FIG. 11.

One alternative to the implementation in FIG. 10 is to use monopulse processing to determine aircraft elevation by having two antenna systems. One antenna system would determine the 2D (or planar) azimuth of the aircraft using monopulse processing while another antenna system, mounted atop the first antenna system, would use monopulse processing to determine the elevation of the aircraft. By using these two antenna systems, the 3D position of the aircraft can be determined. (Of course, the distance to the aircraft would be determined by using time of travel calculations for the transponder signals to find this distance.) FIG. 11 illustrates this alternative. In FIG. 11, the top or "vertical" antenna determines the elevation of the aircraft while the "horizontal" antenna determines the azimuth of the aircraft. The vertical antenna is, as can be seen, mounted atop the horizontal antenna. For ease of processing and to obtain better results, the vertical antenna may be tilted slightly away from 90 degrees. This tilt is shown in exaggerated form in FIG. 12.

Figure 8:
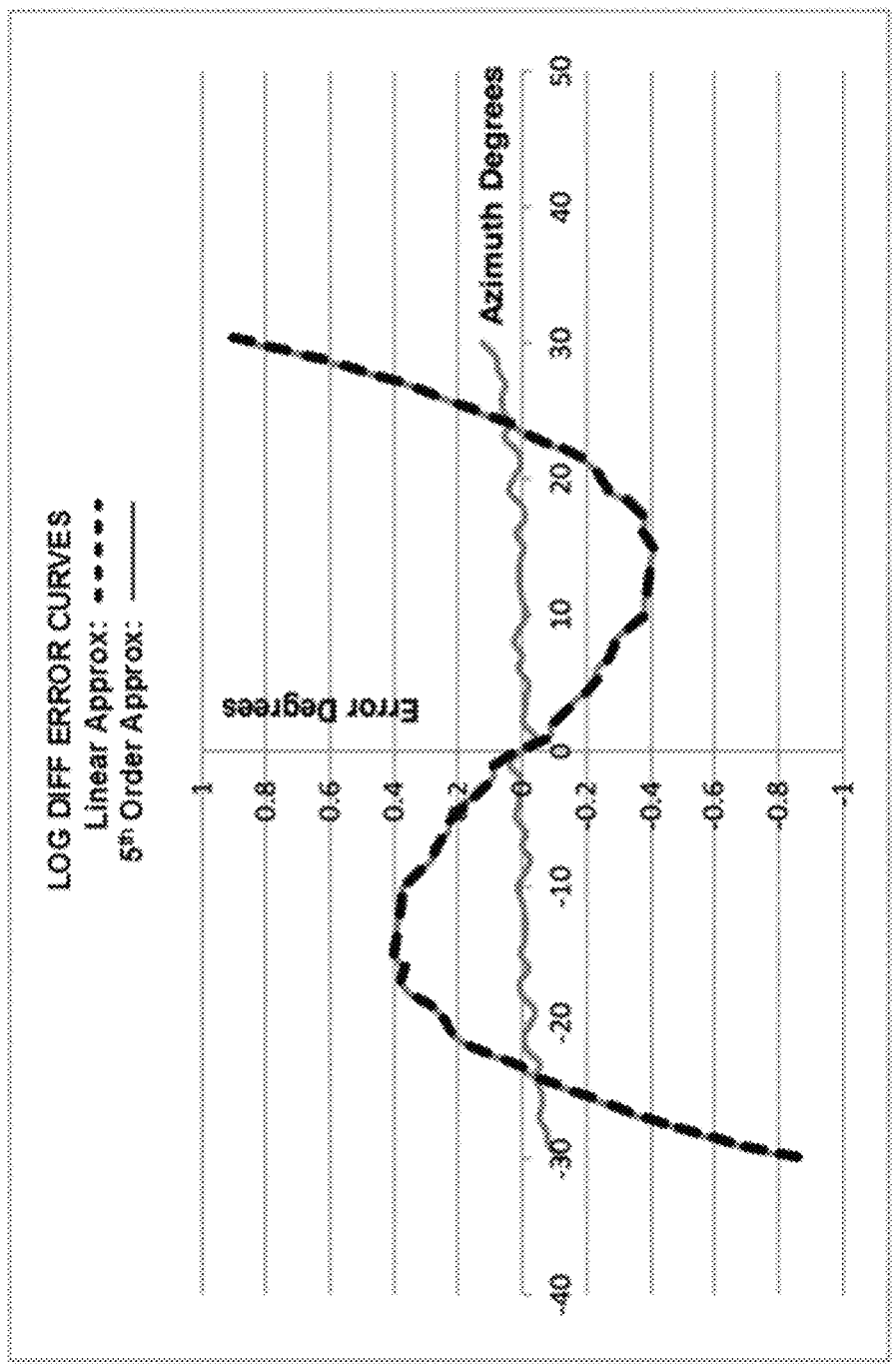
FIG. 8 illustrates error correction curves used to determine error correction factors.

There are several models for calibration/error reduction curves that can be considered. These fall into the following classes:

Linear: $Y=a+bX+\epsilon$
Quadratic: $Y=a+bX+cX2+\epsilon$
Power: $Y=aXb\epsilon$
Non-linear: $Y=g(X)+\epsilon$ FIG. 8 shows how the Wide Angle Monopulse azimuth resolution can be improved by applying a quadratic error reduction curve.

The various embodiments of the present invention can also be dynamically calibrated. As noted in this document, the various aspects of the present invention can be used to calculate the AOA of ADS-B targets that have GPS-precision position information. These ADS-B "Targets Of Opportunity" can also be used to dynamically calibrate the antenna systems of the present invention.

Monopulse Secondary Surveillance Radar (MSSR) typically uses a test transponder (sometimes called a PARROT (Position Adjustable Range Reference Orientation Transponder)) that is some distance from the MSSR as a rough test/calibration.

The PARROT responds to interrogations from the MSSR with known altitude and transponder code. Delay can be introduced in the response to simulate a greater range.

The PARROT responds to each interrogation as the MSSR antenna "sweeps" past the PARROT. Using this, 5 to 15 responses can be obtained from the PARROT. These responses can be averaged to act as calibration.

Figure 13:
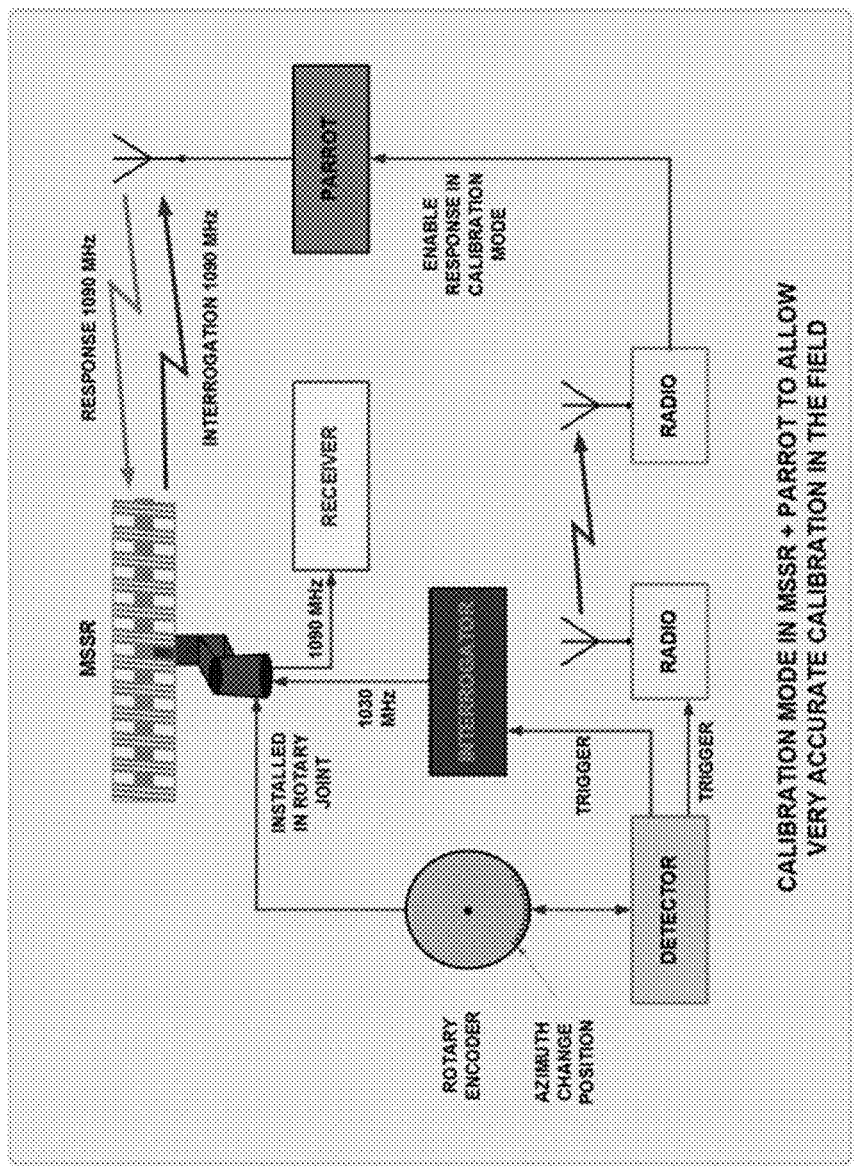
FIG. 13 shows a calibration mode for field calibration.

A more accurate technique would be to incorporate a more accurate calibration mode into the PARROT (see FIG. 13).

The MSSR has a rotary encoder that divides the 360-degree azimuth coverage into anywhere from 4096 (older RADAR) to 16,384 (newer RADAR) Azimuth Change Positions. If the PARROT is accurately positioned on one of these positions, then, in calibration mode the MS SR would interrogate on this position. The PARROT can then be enabled to respond once. This interrogation would be timed such that the response was obtained during the azimuth position. The PARROT should be on boresight of the specific antenna panel pair such that any off-boresight error can be corrected (e.g. in software).

This procedure may need to be repeated as other signals (e.g. ADS-B, TCAS, etc.,) may interfere.

For a terminal MSSR with a rotation rate of 5 seconds, the "dwell" time on each Azimuth Change Positions would be 5/16,384 or 305 uS. Using a RADAR nautical mile of 12.36 uS, the PARROT could be located (real or simulated) up to 24 nautical miles from the MS SR to respond within the "dwell" time. This would provide a calibration azimuth of ⅟₁₆, 384 or 0.0000610 degrees.

During installation, a special procedure would be available to incrementally step the MS SR antenna forwards and backwards so that a specific Azimuth Change Position (where an interrogation would result in the PARROT's response being the minimum off-boresight) could be determined. This determined Azimuth Change Position would then be used for operational calibration.

Enabling of the PARROT in Calibration mode could be achieved via:

Special Phase-encoded P1/and P3 pulse and/or P2 (P1, P2 and P3 are normally Pulse Amplitude Position modulated).

Microwave/wireless transmission.

Land line.

Regarding ADS-B, this technology has its issues. These include:
a) Solar flares disrupt the Earth's magnetic field which disrupts the path between the GPS satellite receivers. This can result in highly inaccurate GPS positions.
b) Equipment problems on the GPS satellites that impact GPS accuracy but may not be detected for up to 24 hours.
c) Avionic equipment problems on the aircraft.
d) Ground equipment problems.
e) Spoofing (malicious injection of a false signal into the system).

To address these issues, the International Civil Aviation Organization (ICAO) mandated that a separate "Reasonableness Check" system be used to check the validity of the aircraft position reported in the ADS-B message.

Aspects of the present invention can provide the "reasonableness check" system to check the aircraft position based on the ADS-B message as the present invention provides the aircraft's AOA. The range from the present invention's radar antenna to the aircraft can also be checked by comparing SSR and ADS-B position information for improved safety and security.

With judicious processing and a number of other enhancements, the present invention can be used to provide a whole suite of air traffic control capabilities including: DME, VOR, ILS, TACAN, VORTAC, and Emergency Service based on Integrated Surveillance/Nav Aids.

DME

DME (Distance Measuring Equipment) is the reverse of SSR. With SSR, the ground RADAR interrogates a transponder on the aircraft at 1030 MHz and receives a response at 1090 MHz. With DME, the aircraft interrogates a transponder on the ground (DME Nav Aid) at one frequency and receives a response at another frequency; using a Search Mode and a Track Mode.

Figure 14:
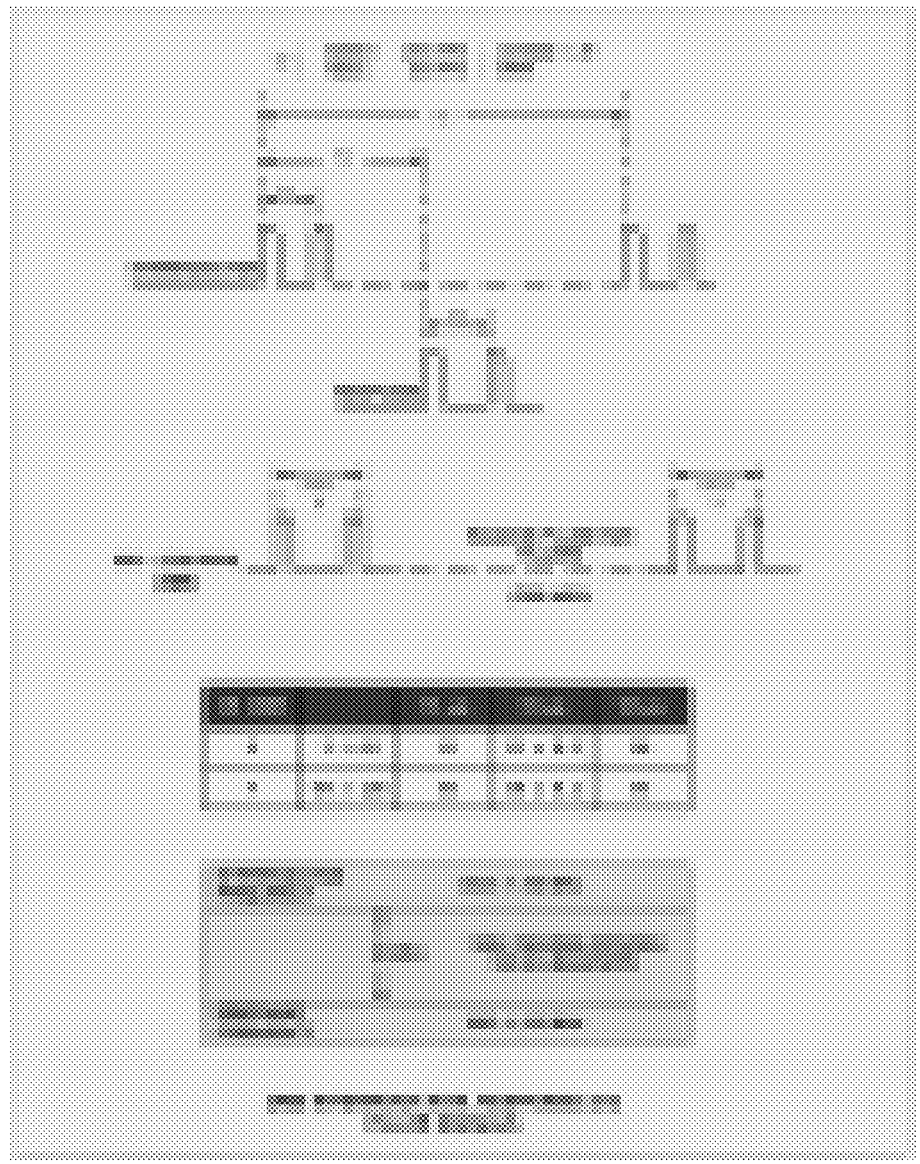
FIG. 14 relates to SEARCH MODE for a DME related implementation of one aspect of the present invention.

In SEARCH MODE, 150 interrogations Pulse-Pairs Per Second are used. In this mode, the aircraft interrogates the ground transponder with a series of pulse-pairs (interrogations) and, after a precise time delay (typically 50 microseconds), the ground station replies with an identical sequence of pulse-pairs (see FIG. 14). The DME receiver in the aircraft searches for reply pulse-pairs (X-mode=12 microseconds spacing) with the correct interval and reply pattern to its original interrogation pattern. (Pulse-pairs that are not coincident with the individual aircraft's interrogation pattern (i.e. not synchronous) are referred to as filler pulse-pairs, or squitter. Also, replies to other aircraft that are therefore non-synchronous also appear as squitter)

In TRACK MODE, the system uses less than 30 interrogation PPPS, as the average number of pulses in SEARCH and TRACK is limited to max 30 pulse pairs per second. In this mode, the aircraft interrogator locks on to the DME ground station once it recognizes a particular reply pulse sequence has the same spacing as the original interrogation sequence. Once the receiver is locked on, it has a narrower window in which to look for the echoes and can retain lock.

In remote areas, the DME frequencies can be selected to be close to the 1030 MHz-1090 MHz SSR frequencies. For example:

| | |
|---|---|
| CHANNEL 66Y DME XMIT 1090 MHz | DME RCV 1027 MHz |
| CHANNEL 67Y DME XMIT 1091 MHz | DME RCV 1027 MHz |

Figure 15:
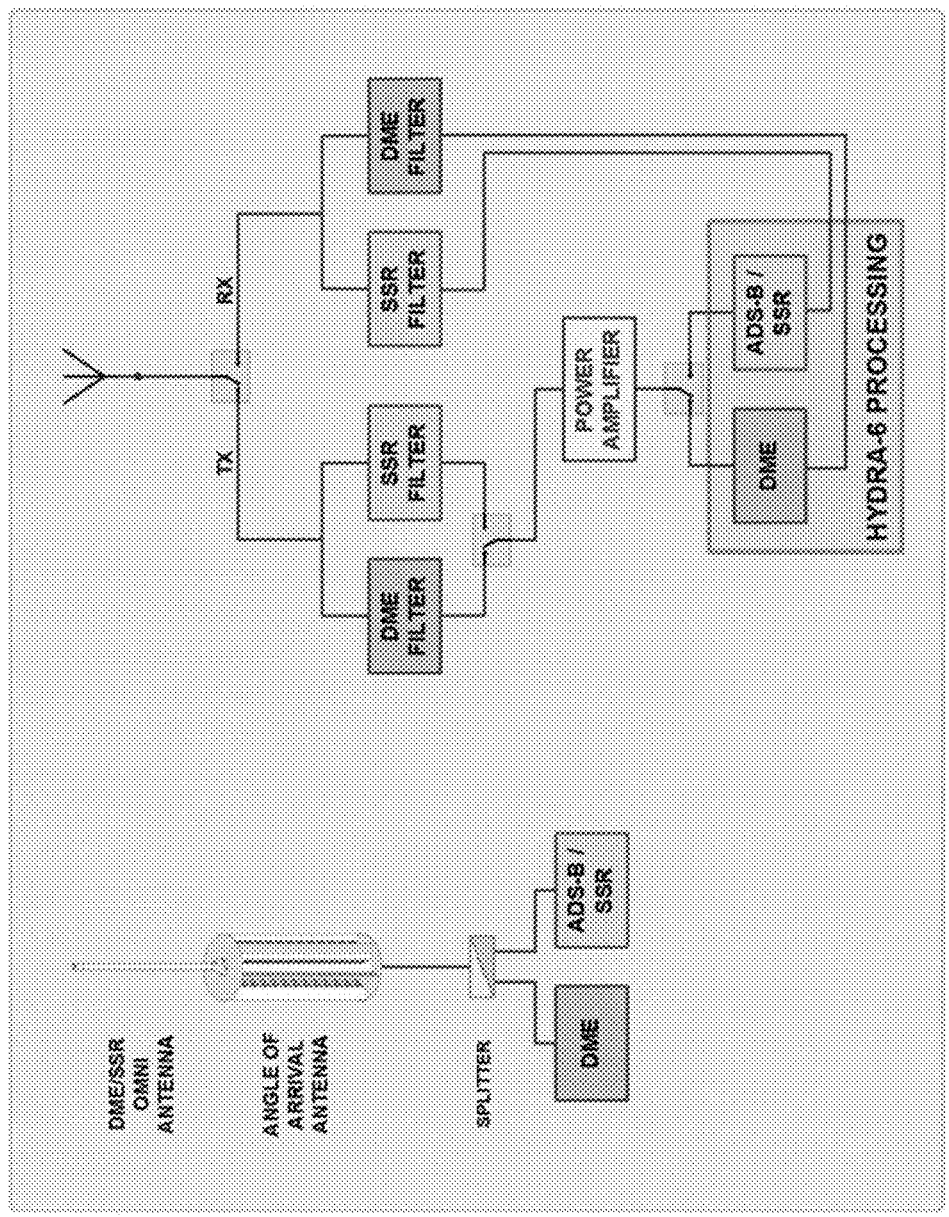
FIG. 15 is a schematic diagram of a system incorporating the present invention and DME processing.

The above means that, in one implementation, DME capability is incorporated into the present invention (see left side of FIG. 15). For such an implementation, DME filters are not required.

For the right side of FIG. 15, the power amplified is used where the DME frequencies are not close to the SSR frequencies. In such a case, a Power Amplifier (PA) covering the frequency range 960-1,215 MHz is used. This could be used for transmitting the SSR Interrogation Signal at 1030 MHz and the DME Responses at 960-1,215 MHz. (For clarity, the present invention may be referred to as Hydra in the figures)

Pseudo VOR/DVOR (PVOR)

For small airports with only 1 aircraft arriving/departing at a time, a VOR (Very-high-frequency Omni-directional Radio-Range Beacon) facility is expensive. For this level of traffic (1 aircraft arriving/departing at a time), a simpler VOR is possible.

Figure 16:
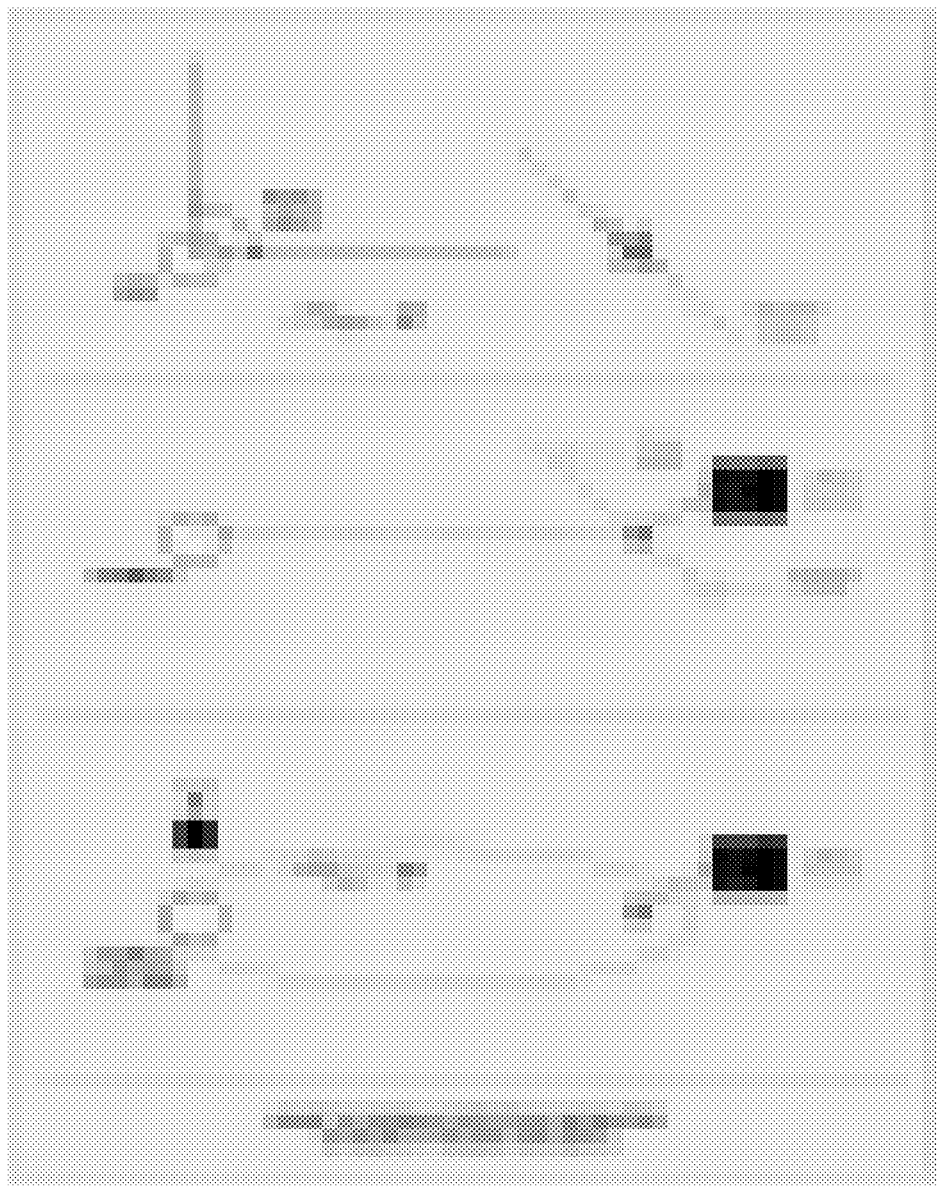
FIG. 16 is a schematic diagram illustrating the present invention in use with pseudo-VOR signal.
Figure 17:
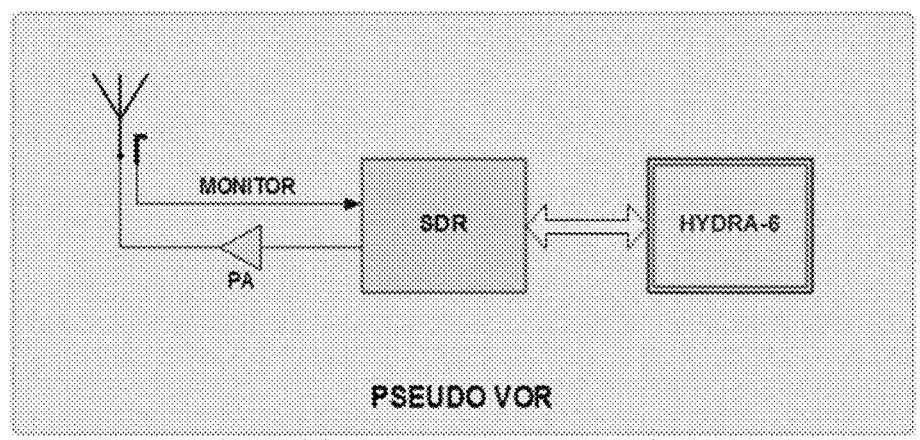
FIGS. 17 and 18 illustrate possible implementations of the present invention as applied to VOR capabilities.

Implementations of the present invention will detect the radial of an aircraft using the ADS-B and/or SSR signals from the aircraft (See FIG. 16). The VOR Reference and Variable Phase signal phase-relationship is known for each radial. So, the Reference and Variable Phase signals for that radial can be transmitted as an integrated signal using a simple Radio (e.g. Software Defined Radio—SDR) and Omnidirectional Antenna (see FIG. 17). This approach eliminates the problems of non-ideal spectrum and parasitic coupling. In addition, using a vertical omnidirectional antenna for the combined signal significantly reduces the effects of snow coverage (e.g. deep snow coverage of the DVOR antennas can distort the signals).

Figure 18:
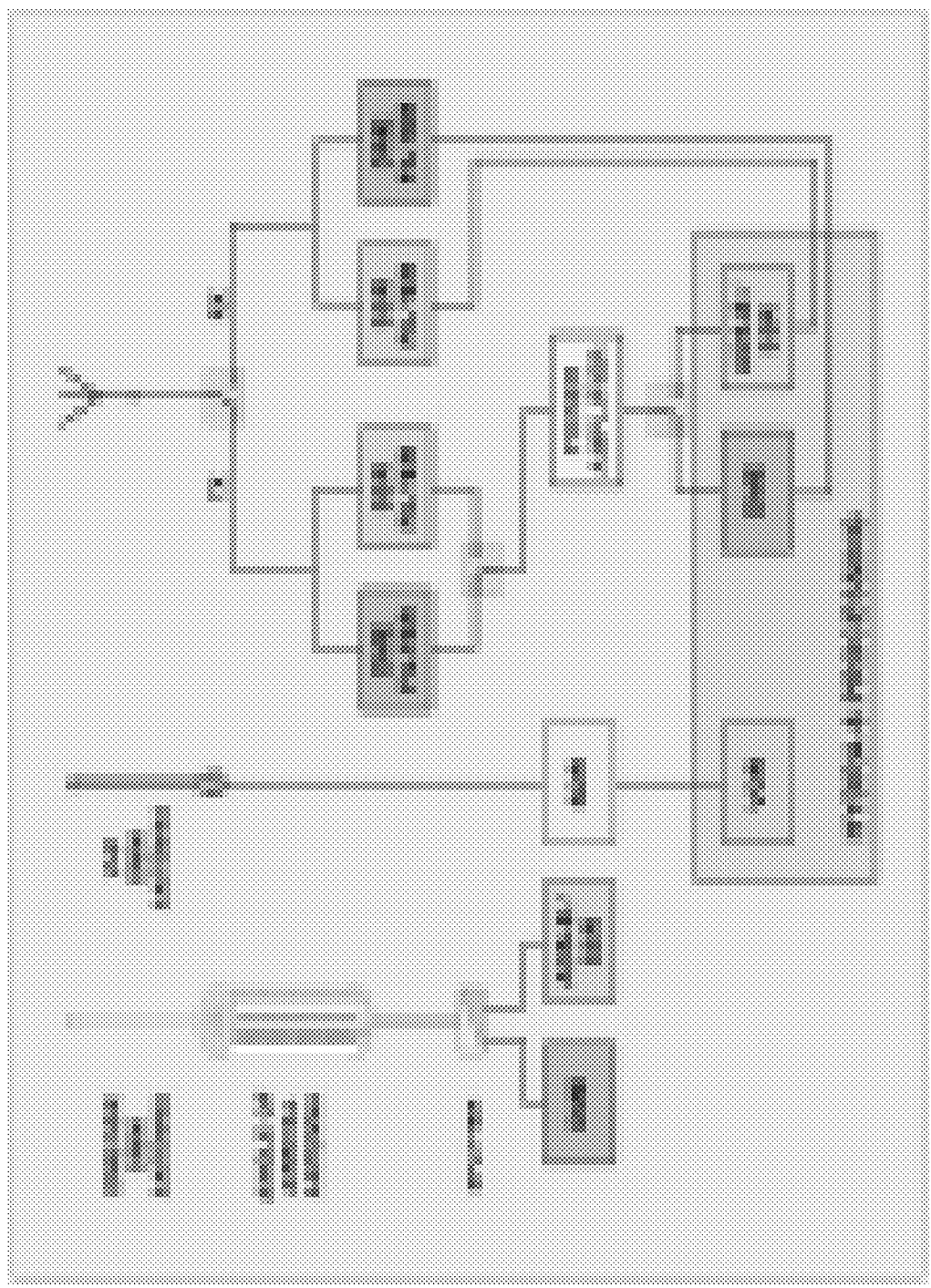

One resulting possible configuration of the system of the present invention is shown in FIG. 18.

The VOR or pseudo-VOR signal can be transmitted 30 times per second as per the conventional and DOPPLER VORs. Alternatively, the signal it can be transmitted continuously to improve reception by the aircraft (with normal VOR, the aircraft has to integrate the 30 signals per second).

One possible issue of this technique is that only 1 aircraft can be handled at a time within PVOR coverage. This issue can be dealt with by providing multiple of PVOR systems working concurrently in parallel at different frequencies.

Advanced VOR (APVOR)

VOR incorporates a voice channel in the Reference Signal. This can be used to broadcast information to all aircraft (e.g. Severe Weather Warning, ATIS, etc.). It could also be used to broadcast bearing information to aircraft.

When more than 1 aircraft is arriving or departing at the same time, the PVOR can send Radial information that will be ambiguous. It will not be clear which of the 2 (or more) aircraft it applies to.

Figure 19:
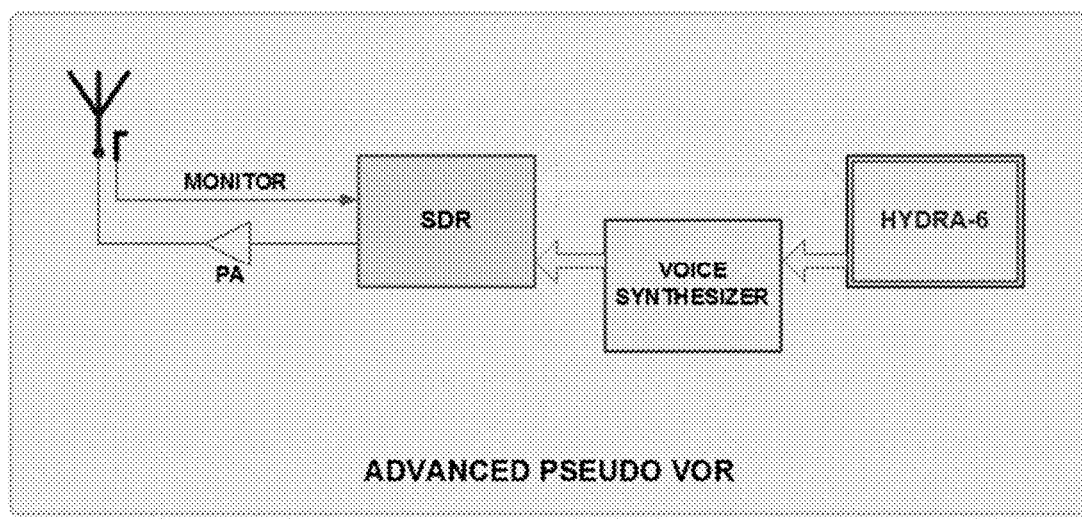
FIG. 19 is a block diagram of the present invention as applied to providing a voice channel to aircraft.

A voice synthesizer, driven by the system of the present invention, can be used to provide a vocal bearing over the voice channel to each aircraft (see FIG. 19).

For SSR-only aircraft, only the transponder code is likely known (not the call-sign). To address this situation, a possible scenario could be to provide the squawking code:

"Aircraft Squawking Code 1234, your Bearing to <Airport ID> is 247 degrees".

"Aircraft Squawking Code 3241, your bearing to <Airport ID> is 058 degrees".

For SSR and ADS-B equipped aircraft, the call-sign may be available in a filed Flight Plan accessible by the system of the present invention. In which case a possible scenario could be:

"Aircraft Squawking Code 1234, your Bearing to <Airport ID> is 247 degrees".

"Air Canada 5234, your Bearing to <Airport ID> is 058 degrees".

This vocalization could be interspersed by vocalization of other information (e.g. Severe Weather Warnings, ATIS, etc.).

Also, when APVOR Radial information may be ambiguous, the Radial information can be suppressed or made to rotate in such a fashion so as to warn of an ambiguous situation (e.g. rapid clockwise rotation).

Synthesized VOR/DME

It should be noted that lower cost, general aviation aircraft may not be equipped with DME and, as such, such aircraft will not be able to determine range from the VOR/DME Nav Aid. However, the system of the present invention knows the range of the aircraft and, as such, this can be provided to the aircraft as part of the APVOR message as follows:

Aircraft squawking Transponder Code 1234, your Range is 07 and Bearing is 090 to <Station ID>.

TLS

A Transponder Landing System (TLS) can be used in place of an ILS (instrument landing system) using the present invention. An Instrument Landing System (ILS) is defined as a precision runway approach aid based on two radio beams which, together, provide pilots with both vertical and horizontal guidance during an approach to land. These two beams are known as the localizer and the glideslope. The localizer is for left-right guidance while the glide slope is for up/down guidance.

Figure 20:
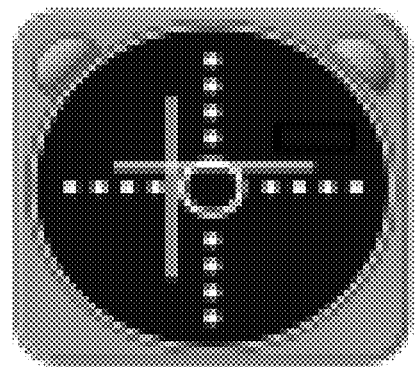
FIG. 20 illustrates an ILS instrumentation as seen by a pilot.

TLS uses an array of antennas on the airport to detect the 3D position of the transmission from the SSR transponder on the aircraft. The glideslope and localizer ILS signals are then synthesized to control the "needless" of the ILS display in the cockpit (see FIG. 20), to guide the aircraft on a standard or customized Glide Slope/Localizer Approach. In the ILS cockpit instrument, the horizontal needle is for glideslope guidance while the vertical needle is for runway (localizer) guidance.

This technique eliminates the biggest problems in ILS— that of customizing the ILS antenna pattern to compensate for site problems (e.g. uneven terrain, hangar reflections, etc.).

Using the system of the present invention, an alternative to TLS can be implemented. In such an implementation, the system of the present invention uses monopulse Angle Of Arrival (AOA) which allows for a much more compact sensor than the TLS (i.e. the TLS requires a 9 m Elevation Antenna Array as opposed to the 2.5 m Elevation Array for the antenna of the present invention).

In this implementation, the antenna system of the present invention detects the 2D azimuth of the transponder signal. However, as noted above, an implementation of a vertical antenna and a horizontal antenna can be used to determine the 3D position of the aircraft. This implementation will provide Vertical Angle Of Arrival (AOA) on the aircraft's SSR Transponder while the horizontal antenna will provide the Azimuth AOA. Combined, this provides the 3D position of the transponder signal (Mode A/C/S responses).

For such an implementation (see FIG. 11) a calibration plate with calibration probes is mounted between the two antennas. The calibration probes are on each boresight to allow calibration of the two vertical beams relative to the boresight.

It should be clear that, for ILS operation, the altitude reported by the aircraft, in an SSR Interrogation Response, cannot reliably be used for ILS. The source could be the altimeter which may not be set correctly or there may be a significant difference in the barometric altimeter setting (QNH) where it was set and the QNH of the local airport. Alternatively, the source could be GPS. However, during solar flare events, the earth's magnetic field is perturbed which could result in a wrong altitude being calculated.

With an accurate AOA Azimuth and Altitude on the Transponder signal, an ILS module included in this variant of the present invention, will calculate and transmit the correction to the "needles" of the ILS display in the cockpit (as per TLS).

Figure 21:
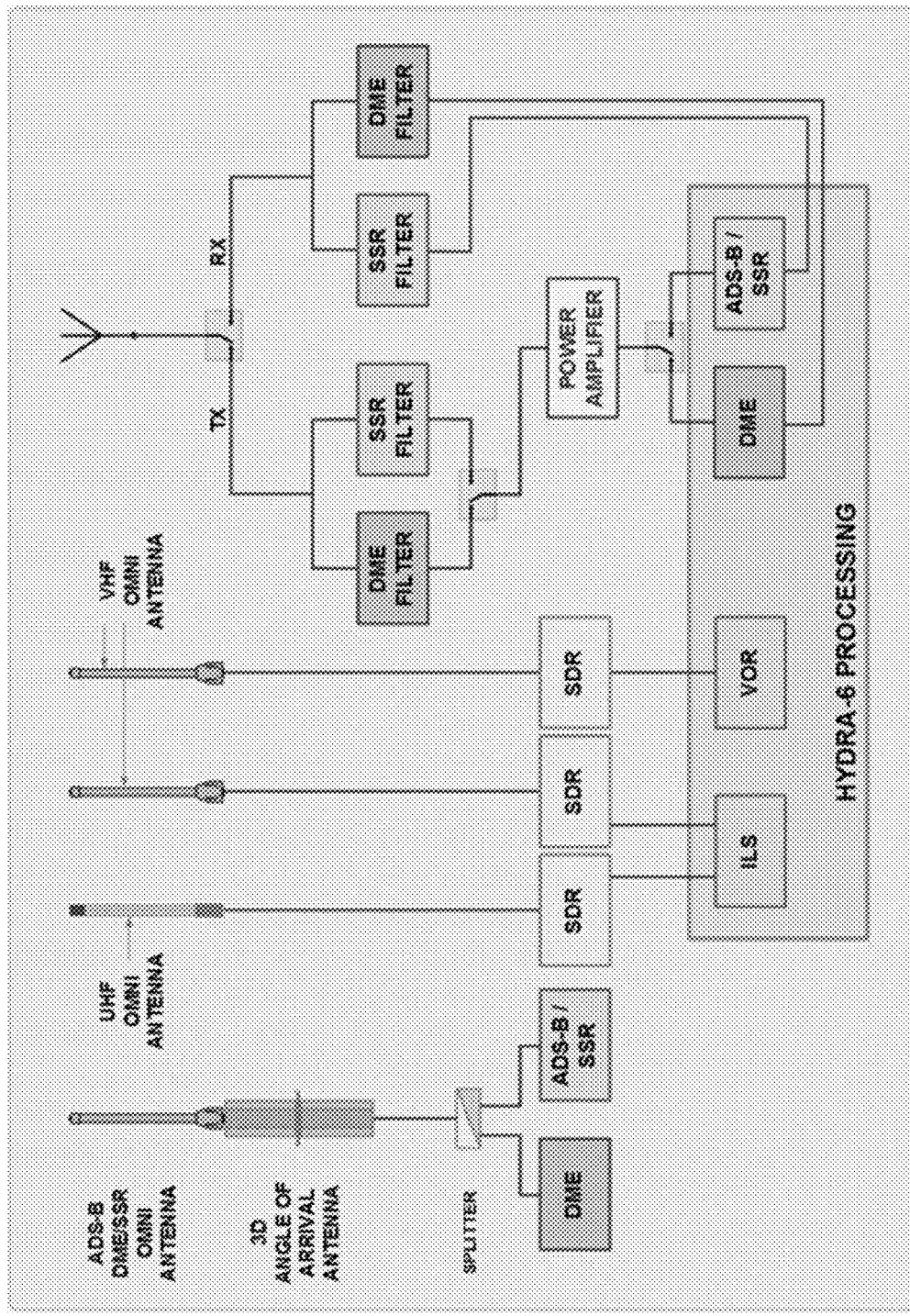
FIG. 21 illustrates a functional configuration of a system incorporating the various possible enhancements to the present invention.

Referring to FIG. 21, a functional configuration that is useful for ILS functions, DME functions, SSR functions, VOR/DVOR function, and ADS-B functions is illustrated.

It should be clear that the implementation of the present invention that uses beam formers (illustrated schematically in FIG. 9) may also be used to determine the aircraft's 3D position.

Pseudo TACAN (PTACAN)

The same technique of synthesizing the North Reference and Variable Azimuth Signal, used in the PVOR outline above, can also be used for Tactical Air Navigation (TACAN).

TACAN is used by military aircraft and it provides the user with bearing and distance (slant-range or hypotenuse) to a ground or ship-borne station. It is a more accurate version of the VOR/DME system that provides bearing and range information for civil aviation. The DME portion of the TACAN system is available for civil use at VORTAC facilities where a VOR is combined with a TACAN. Civil aircraft can receive VOR/DME readings. Aircraft equipped with TACAN avionics can use this system for Enroute navigation as well as non-precision approaches to landing fields.

TACAN operates in the frequency band 960-1215 MHz. The bearing unit of TACAN is more accurate than a standard VOR since it makes use of a two-frequency principle, with 15 Hz and 135 Hz components, and because UHF transmissions are less prone to signal bending than VHF.

The distance measurement component of TACAN operates with the same specifications as civil DMEs. Therefore, to reduce the number of required stations, the TACAN transponder performs the function of a DME without the need for a separate co-located DME. Because the rotation of the antenna creates a large portion of the azimuth (bearing) signal, if the antenna fails, the azimuth component is no longer available and the TACAN downgrades to a DME only mode.

For TACAN (as with the PVOR), the azimuth of the aircraft is known from the present invention's capabilities with SSR and/or ADS-B and/or PSR (via SSR as PSR) and/or DME Interrogation signal (via the present invention's AOA).

The North Reference and Azimuth Variable phase-relationship signal, with Time On Target pulse burst to simulate a rotating antenna, can be synthesized and transmitted to the aircraft.

A primary drawback of TACAN is lack of the ability to control emissions (EMCON) and stealth. Naval TACAN operations are designed so an aircraft can find the ship and land. There is no encryption involved. The issue is that an enemy can simply use the range and bearing provided by TACAN to attack the ship.

Some TACANs have the ability to employ a "Demand Only" mode where they will only transmit when interrogated by an aircraft on-channel. This can be easily compromised by stepping through the channels until a response is obtained.

Figure 22:
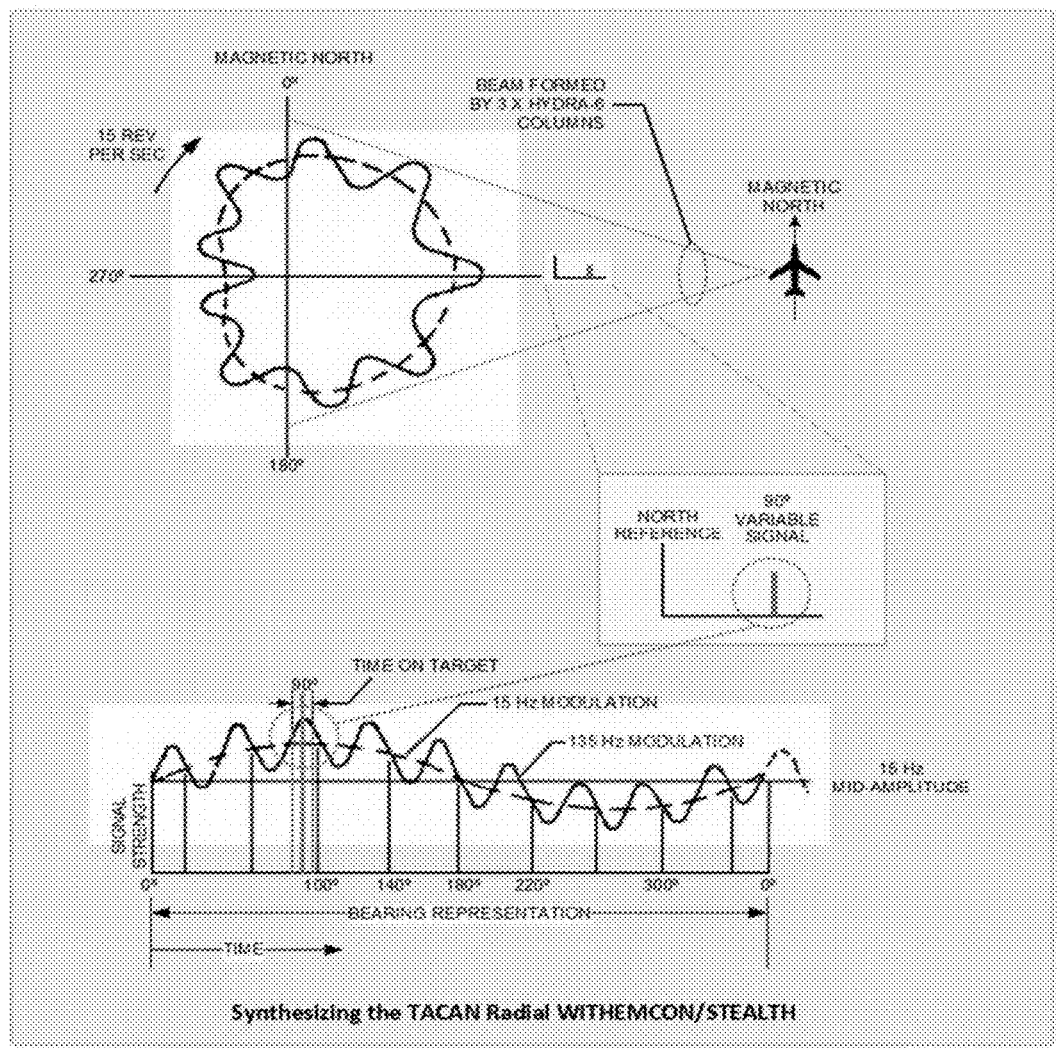
FIG. 22 shows the synthesizing of a TACAN radial.

The present invention can be used such that TACAN is non-transmitting until SSR/IFF identifies the range and azimuth of "Friendlies" or of friendly aircraft. Once the range and azimuth of the friendly aircraft is identified, beam forming (e.g. 3 of the 6 antenna columns in a six sector implementation of the system antenna) is used to selectively beam the TACAN range and bearing information to each "Friendly" on the IFF detected radial to that friendly aircraft (see FIG. 22).

It should also be noted that the transmit power used could be controlled by the IFF range of the friendly aircraft.

The TACAN-based implementation of the present invention has a number of advantages over current TACAN systems. The present invention's TACAN implementation provides a novel TACAN implementation for azimuth as well as a more sophisticated EMCON/Stealth capability. Other advantages or details are as follows:

No TACAN signals until aircraft identified as a "Friendly" by IFF.

TACAN North Reference and Variable Azimuth phase difference signal are synthesized, based on the present invention's antenna system's capabilities in SSR and/or PSR and/or ADS-B and/or DME-Interrogation Signal AOA Detection.

Both the North Reference and Variable Azimuth (radial offset) information sent to the "friendly" aircraft in a tight beam—no omni-directional or 360 degree rotating signals to be intercepted.

Transmit power minimized to that required for the range to the "friendly" aircraft.

Mission/Hourly/Daily Range and Bearing Offset to confuse "seekers" that are seeking to decode the TACAN signal to try and "home-in" on the sensor.

It should be noted that the present invention's VOR/DVOR capability can be combined with the TACAN to provide a VORTAC capability.

SSR as PSR

The SSR interrogation signal will cause a "skin paint" reflection the same as PSR (Primary Search Radar). This allows the use of SSR as PSR. For such implementations, short mode A/C Interrogation pulses (800 ns) can be used for close-in targets. Mode S interrogations pulses (16 or 30 µs) can be used for longer range targets (reference is made to issued U.S. Pat. No. 9,658,325, the contents of which are hereby incorporated herein by reference).

The 3D arrangement of antennas for PILS (pseudo-ILS) will allow the 3D location of an aircraft by PSR.

Figure 23:
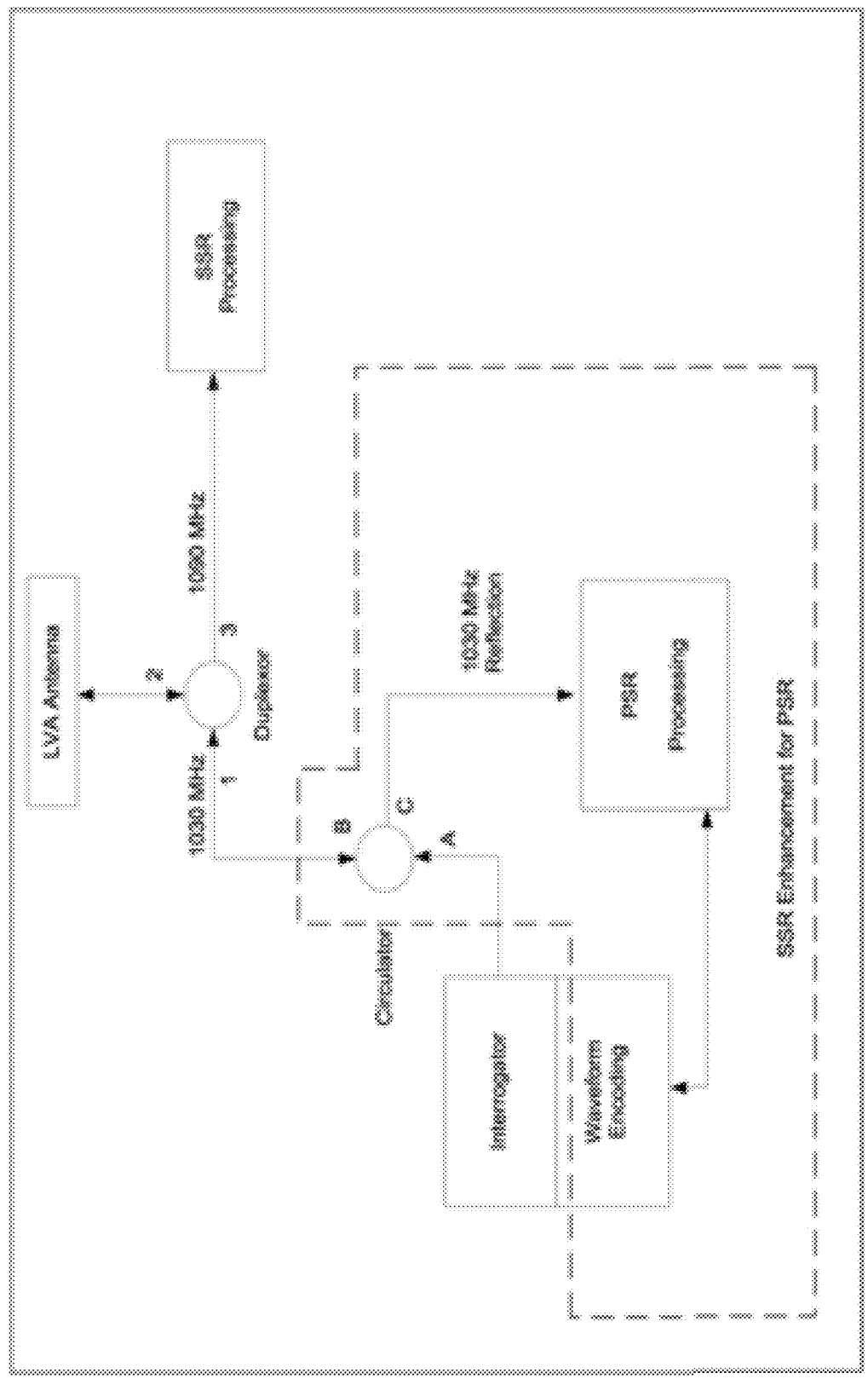
FIG. 23 details enhancements useful for converting an SSR into a combined SSR/PSR.

The enhancement required to convert an SSR into a combined SSR/PSR is shown in FIG. 23. It should be noted that the PSR enhancement can be added to currently existing Monopulse Secondary Surveillance Radars (MSSR) as long as there is an external access to control the P1, P2 and P3 pulses as well as the Mode-S modulation. Where this addition is not possible, the interrogator will need to be replaced by a COTS interrogator (such as the TSL 1100 series from Technical Services Laboratory in Fort Walton Beach, FL) that allows this control.

Figure 24:
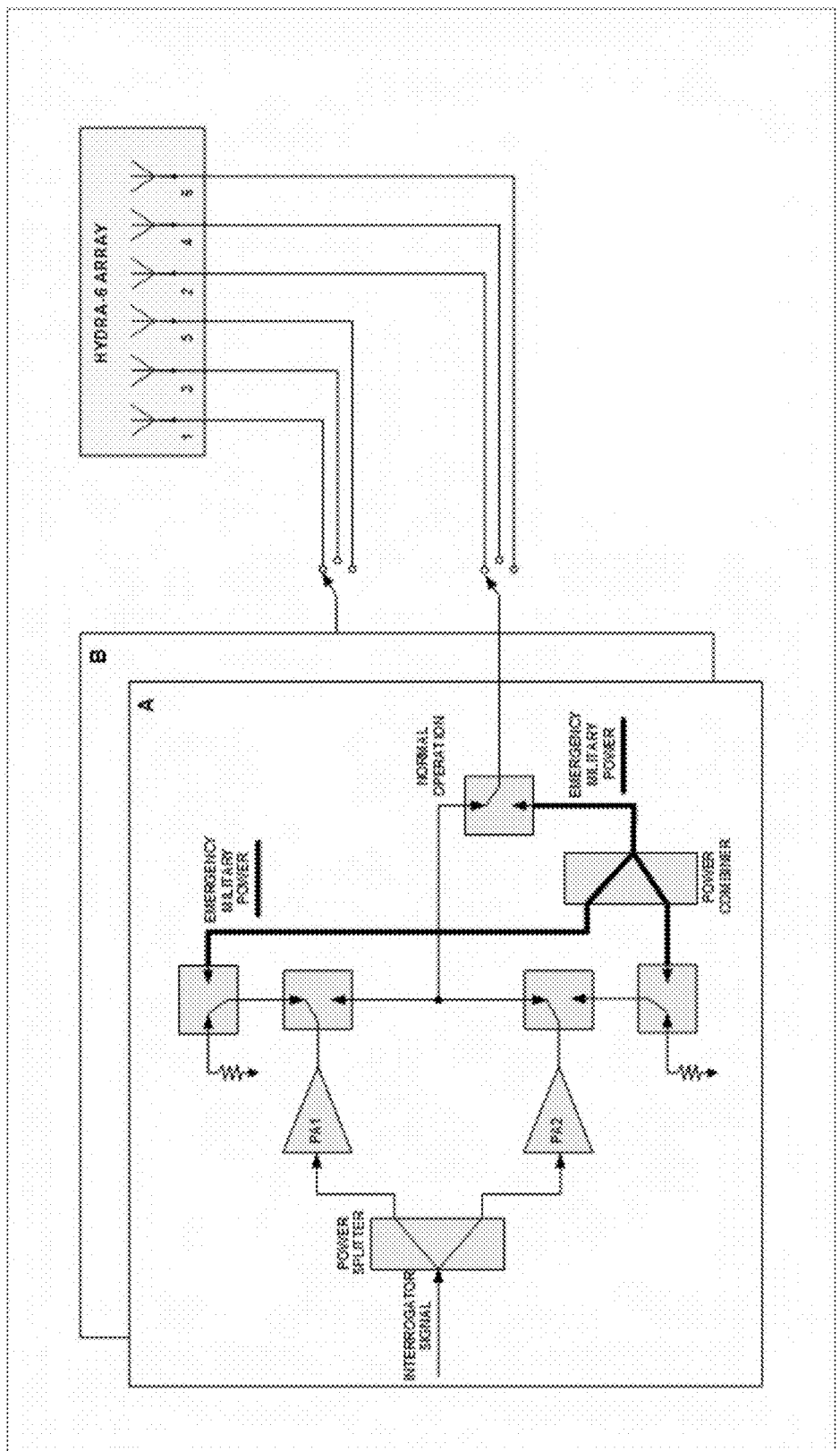
FIG. 24 is a configuration using full military power to provide and extra 3 dB to increase range of detection.

Additions would include:
a) Waveform Encoding.
   This could include:
   Converting the P1, P2 and P3 pulses into Twin Inverted Pulse Radar (TWIPR) pulses.
   Imbedding special codes (Barker, TWIPR, etc.) into the Mode-S payload.
b) Circulator
   This would allow the 1030 MH2 interrogator signal to be routed to the Large Vertical Aperture (LVA) MSSR antenna, via the Duplexer.
   The Circulator acts as a "Traffic Cop" to route the Interrogation signal from Port A to Port B and the 1,030 MHz "skin" reflection from Port B to Port C for PSR Processing.
c) Duplexer
   The Duplexer is a 3-port dual filter. Between Port 1 and 2 is a 1,030 MHz Pass Band Filter. Between Port 2 and 3 is a 1,090 MHz Pass band Filter.
   The Interrogation pulse at 1,030 MHz is coupled from Port 1 to Port 2 (the Antenna); but is "blocked", by the 1,090 MHz Pass Band Filter, from passing to Port 3.
   The SSR responses at 1,090 MHz are passed from the antenna on Port 2 to the SSR Processing on Port 3 but are "blocked", by the 1,030 MHz Pass Band Filter from passing to Port 1.
   However, the 1,030 MHz "skin" reflection is passed from the antenna on Port 2 to Port 1.
d) PSR Processing
   This would consist of industry standard PSR processing (e.g. Doppler processing) enhanced with proprietary special processing to complement the waveform encoding scheme (e.g. Barker, TWIPR, Dense Pulse, etc.).
   For emergency situations (e.g. helping a lost or damaged aircraft), the normal Master/Standby configuration of 1030 MHz Power Amplifiers could be "ganged", into a "Full Military Power" configuration to provide an extra 3 dB to increase range of detection (see FIG. 24).

Emergency Service

Using SSR as PSR, integrated with the APVOR with added range information, a new emergency service could be created that would be of particular interest in remote areas. Such an emergency service would operate such that if equipment failure resulted in only a radio working on an aircraft, that aircraft could be safely guided to a safe landing.

With this service, a published frequency in the Air-Ground Spectrum is used to deliver location information:

On approach to an airport, the speech synthesized information would include:
   Range
   Bearing
   Altitude
   Aircraft ID For landing, the speech synthesized information would include:
   Above/Below/On the Glide Slope
   Left/Right/On the Localizer
   Flaps Reminder
   Gear Down Reminder This is the equivalent of an automatic Precision Approach Radar (PAR) with "talk-down" by a Controller; with no Controller required.

PAR and PRM

In one implementation (see FIG. 9) the present invention uses an omnidirectional antenna atop the multi-sector antenna system and this omnidirectional antenna is used to broadcast the SSR Interrogation Signal. The antenna system then uses a 6-Sector monopulse antenna (other numbers of sectors are, of course, possible) to process SSR responses concurrently (i.e. all 360 degree responses). Consequently, the target update rate is directly proportional to the Pulse Repetition Frequency (PRF). This very high target update rate allows for precision monitoring of targets.

The 2D azimuth capable implementation of the present invention (a 6-sector implementation) can achieve an azimuth resolution of 0.10. The 3D version of the present invention (see FIG. 9 with stacked antenna subsystems) can achieve an elevation accuracy of 0.10. Because of these capabilities, the stacked version of the present invention can be used for Precision Approach RADAR (PAR). The capabilities of this implementation of the present invention conform to the ICAO requirements for PAR.

These ICAO requirements are also similar to the requirements for Precision Runway Monitoring (PRM). For PRM, the objective is to monitor arrivals to ensure they do not deviate, beyond a specified range-based distance, from the glide slope and localizer centre-line, into a Non-Transgression Zone (NTZ).

NTZ is a corridor of airspace of defined dimensions located centrally between the two extended runway centre-lines. Penetration of the NTZ by an aircraft requires the intervention of a Monitoring RADAR Controller to manoeuvre any threatened aircraft on the adjacent approach when one arriving aircraft starts straying into the NTZ of a parallel arriving aircraft.

It should be noted that, with the stacked version of the present invention, the horizontal and vertical monopulse-derived 3D position of each aircraft can be tracked using the SSR Transponder Response Signal. In addition, it can also be tracked using the SSR Interrogation signal as a PSR, independent of the SSR response, as a redundant Flight Safety method of tracking.

Figure 25:
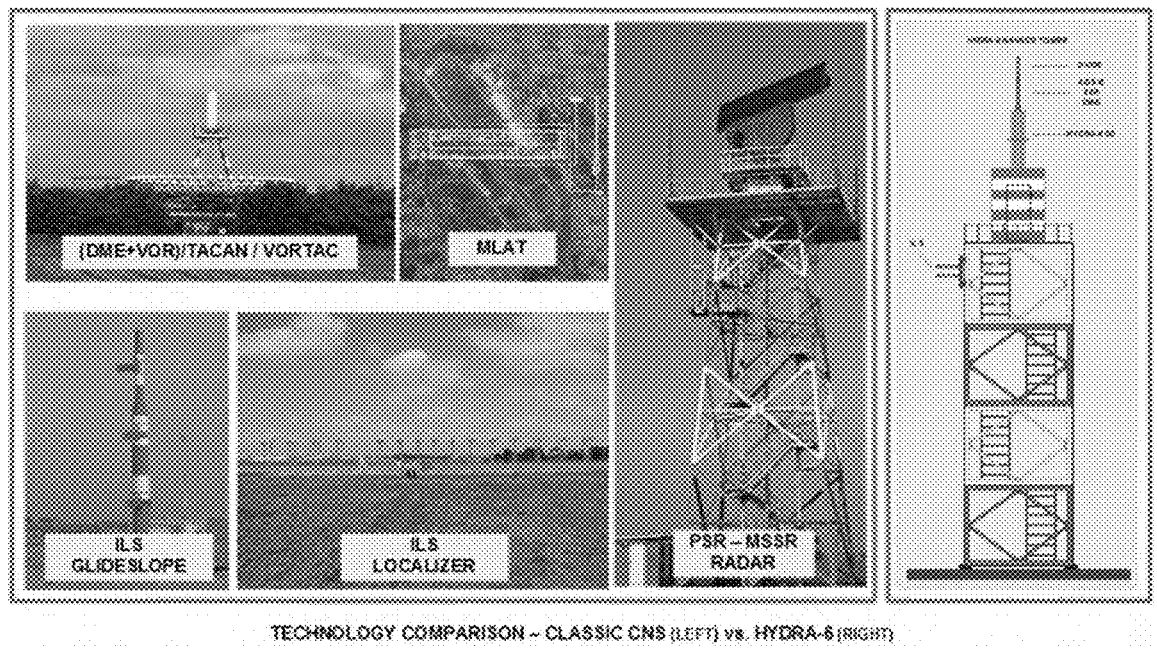
FIG. 25 illustrates the differences in size between prior art technologies and an implementation of the present invention.

FIG. 25 is provided so that the reader can understand that the present invention is a smaller, more compact system than the technologies and devices it is replacing.

A person understanding this invention may now conceive of alternative structures and embodiments or variations of the above all of which are intended to fall within the scope of the invention as defined in the claims that follow.

I claim:

1. An antenna system for use in air traffic control, the system comprising:
   at least one pair of vertical column antenna arrays, said at least one pair producing two beams offset from boresight and said at least one pair covering a sector of a coverage of said antenna system,
   wherein said antenna system is used for wide angle monopulse processing of at least one signal from an aircraft to determine a two-dimensional azimuth of said aircraft relative to said at least one pair of said vertical column antenna arrays,
   wherein said azimuth is based on a logarithm of a difference in amplitude/phase of said two beams,
   and wherein a correction factor is applied to said azimuth for specific values in elevation.

2. The antenna system according to claim 1, wherein said antenna system further comprises a further plurality of pairs of vertical column antenna arrays, said further plurality of pairs of vertical column antenna arrays being for wide angle monopulse processing of said at least one signal from said aircraft to determine an elevation of said aircraft relative to at least one pair of said further plurality of pairs of vertical column antenna arrays.

3. The antenna system according to claim 1, wherein at least one of said vertical column antenna arrays comprises a plurality of vertically arranged antenna array elements.

4. The antenna system according to claim 3, wherein said antenna array elements comprise at least one of: dipoles antenna array elements, patch antenna array elements, dielectric resonators antenna elements, slot antenna elements, cavity based slot antenna elements, and open ended waveguide antenna elements.

5. The antenna system according to claim 2, wherein said further plurality of pairs of vertical column antenna arrays is mounted atop said plurality of pairs of vertical column antenna arrays.

6. The antenna system according to claim 5, wherein said further plurality of pairs of vertical column antenna arrays is tilted away from vertical atop said plurality of pairs of vertical column antenna arrays.

7. The antenna system according to claim 1, wherein said at least one signal from said aircraft is transmitted by said aircraft in response to an interrogation signal.

8. The antenna system according to claim 1, wherein said at least one signal from said aircraft is transmitted by said aircraft absent a ground sound interrogation signal.

9. The antenna system according to claim 1, wherein said correction factor is predetermined for specific values in elevation.

10. The antenna system according to claim 1, wherein said correction factor is interpolated between predetermined correction factor values for specific elevation values.

11. The antenna system according to claim 1, wherein said antenna system is used to provide at least one navigational aid to aircraft, said at least one navigational aid being at least one of: DME, VOR, ILS, TLS, TACAN, VORTAC, Pseudo-VOR, APVOR, Pseudo-ILS, Pseudo-TACAN, and use of SSR as a PSR.

12. The antenna system according to claim 1, wherein said antenna system has a multiple sector coverage using multiple pairs of said multiple vertical columns antenna arrays.

13. The antenna system according to claim 3, wherein at least one of said vertical column antenna arrays comprises at least two vertically arranged antenna array elements.

14. The antenna system according to claim 1, wherein the antenna system is comprised in a static, circular, multi-sector antenna sensor.

15. The antenna system according to claim 14, wherein said azimuth is determined by reference to a predetermined lookup table.

16. The antenna system according to claim 14, wherein the antenna sensor is also for use in wide angle monopulse processing of said at least one signal originating from an aircraft to determine an angle of arrival.

* * * * *